United States Patent
Greeff et al.

(10) Patent No.: US 10,846,143 B2
(45) Date of Patent: Nov. 24, 2020

(54) PREDICTING CAPACITY OF SHARED VIRTUAL MACHINE RESOURCES

(71) Applicant: Microsoft Technology Licensing, LLC, Redmond, WA (US)

(72) Inventors: Esaias E. Greeff, Redmond, WA (US); John Lawrence Miller, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 26 days.

(21) Appl. No.: 16/402,133

(22) Filed: May 2, 2019

(65) Prior Publication Data

US 2019/0258527 A1   Aug. 22, 2019

Related U.S. Application Data

(62) Division of application No. 15/411,906, filed on Jan. 20, 2017, now Pat. No. 10,324,765.

(51) Int. Cl.
*G06F 9/50* (2006.01)
*G06F 9/46* (2006.01)

(52) U.S. Cl.
CPC .............. *G06F 9/5077* (2013.01); *G06F 9/46* (2013.01)

(58) Field of Classification Search
CPC .................................................. G06F 9/5077
See application file for complete search history.

(56) References Cited

U.S. PATENT DOCUMENTS 9,069,606 B2 * 6/2015 Donahue ............... G06F 9/5083
2013/0174146 A1 * 7/2013 Dasgupta ............. G06F 9/5077
                                                              718/1

* cited by examiner

*Primary Examiner* — Charlie Sun
(74) *Attorney, Agent, or Firm* — Newport IP, LLC; Mike R. Cicero

(57) ABSTRACT

Predicting capacity of shared virtual machine (VM) resources by generating estimated remaining capacities (ERCs) for computing clusters within a virtualization system rather than continuously monitoring actual remaining capacities (ARCs). Generating ERCs for a virtualization system's computing cluster(s) by using physical resource allocation flux data and/or VM type exchange probabilities provides benefits over continuously monitoring ARCs. The physical resource allocation flux data may correspond to commissioning and decommissioning VMs into the cluster and may be obtained during a blind period when current ARCs are unknown. For example, the physical resource allocation flux may be an indication of how many instances of each VM type are commissioned and/or decommissioned from the cluster over a time interval of interest. The VM type exchange probabilities may indicate a likelihood that commissioning or decommissioning a VM type into the computing cluster(s) will take up or free up computing resources available to other VM types, respectively.

20 Claims, 9 Drawing Sheets

*Note:* In FIG. 1A, the " * " symbol designates VM instances that are decommissioned prior to t = N as shown in FIGS. 1B and 1C.

(Chart. 1)

PREDICTING CAPACITY OF SHARED VIRTUAL MACHINE RESOURCES

PRIORITY APPLICATION(S)

This application is a divisional application of, and claims the benefit of priority to, U.S. Non-Provisional application Ser. No. 15/411,906 filed on Jan. 20, 2017, the entire contents of which are incorporated herein by reference.

BACKGROUND

Demand for Virtual Machines (VMs) is rising as businesses continue to realize the benefits of virtual computing solutions over obtaining and deploying physical computing resources of their own. These benefits include flexibility in terms of both scalability and cost as businesses can deploy more VMs as computing needs increase and less VMs as computing needs decrease. Furthermore, because businesses are basically "renting" physical resources when they request the VM service provider to deploy a VM, difficulties associated with appropriately scaling and managing physical resources are a burden to the VM service providers—not the businesses. In particular, VM service providers are faced with the difficult task of optimizing physical resource usage levels to mitigate costs associated with idle physical resources while still having adequate physical resources available to service current and future client reservations. Achieving optimal physical resource usage levels requires VM service providers to continually forecast future demand for virtual computing solutions, e.g. to determine how many new data centers and/or computing clusters to deploy. Furthermore, VM service providers must also accept or deny requests to immediately deploy VMs and/or accept reservations for future VMs with imperfect information regarding current physical resource usage levels, e.g. current remaining capacities may be unknown. Denying a request when adequate physical resources are available results in under usage of physical resources whereas accepting a request without adequate physical resources available to service the request may result in failed attempt to deploy the VMs.

It is with respect to these considerations and others that the disclosure made herein is presented.

SUMMARY

Technologies are described herein for predicting capacity of shared virtual machine (VM) resources. Generally described, configurations disclosed herein enable a system to generate estimated remaining capacities (ERCs) for computing clusters within a virtualization system rather than continuously monitoring actual remaining capacities (ARCs) of the computing clusters. As used herein, a remaining capacity refers to a remaining number of VMs that a particular cluster can allocate by VM type, e.g. a cluster may have a remaining capacity to allocate four more instances of a particular VM type. Actively monitoring a computing cluster's ARCs by determining a unit amount of remaining physical resources on the computing cluster's individual computing devices is expensive for VM service providers in terms of computing resource consumption. To illustrate this point, consider that virtualization systems are configured to simultaneously deploy vast amounts of VMs and that individual VMs are continuously being commissioned into and decommissioned out of the virtualization systems' computing clusters. Due to the constant flux of how physical computing resources such as, for example, processor cores are allocated to the individual VMs, actively monitoring the computing clusters ARCs is akin to chasing a moving target. Monitoring a physical resource allocation flux at the computing cluster level, however, is substantially less costly than monitoring how physical resources are allocated within each individual computing device.

Accordingly, generating ERCs for a virtualization system's computing cluster(s) by using physical resource allocation flux data and/or VM type exchange probabilities provides benefits over continuously monitoring ARCs of individual computing devices. The physical resource allocation flux data may correspond to commissioning and decommissioning particular types of VMs into the computing cluster(s) of the virtualization system and may be obtained during a blind period in which the system does not actively monitor ARCs. For example, the physical resource allocation flux may be an indication of how many instances of each VM type are commissioned and/or decommissioned from the cluster over a time interval of interest. In some embodiments, the various VM types may be based on a number of physical resource units, e.g. a first type may be an eight CPU core VM and a second type may be a four CPU core VM. The VM type exchange probabilities may indicate a likelihood that commissioning or decommissioning a specific VM type into the computing cluster(s) will take up or free up computing resources available to other VM types, respectively.

For illustrative purposes, consider a scenario where commissioning a first VM type requires an allocation of eight units of a physical resource (e.g. processor cores, gibibytes of RAM, etc.) whereas commissioning a second VM type requires a lesser allocation of four units of the physical resource. In such a case, if the second VM type is commissioned onto a computer having eight units of the physical resources available, then the second VM type will have taken up computing resources previously available to the first VM type. Stated alternatively, although the first VM type could have previously been deployed on the computer when eight physical resource units were available, deploying the second VM type onto the computer leaves only four physical resource units available. Therefore, the first VM type can no longer be deployed on the computer. In contrast, if the second VM type is commissioned onto the computer having seven units of the physical resource available, then the second VM type will have taken up computing resources that were not available to the first VM type since the first VM type could not have been deployed on a computer having seven physical resource units available. Stated alternatively, as the computing device already lacked the necessary physical resource units to deploy the first VM type, deploying the second VM type on the computing device did not affect the computing device's capacity to deploy the first VM type.

According to aspects of the present disclosure, a system is provided for generating estimated remaining capacities (ERCs) of a computing cluster with respect to various VM types and, based thereon, determining whether to fulfill requests to commission VMs into the computing cluster. The system may also determine amounts of a physical resource that is discreetly installed within individual computing devices of the computing cluster. For example, the computing cluster may be analyzed to determine numbers of processors and/or processor cores (or any other computing resource for that matter) discreetly installed within individual computing devices of the computing cluster. Based on the amounts of the physical resource, the system may determine maximum capacities of the computing cluster with respect to individual VM types. A maximum capacity of the computing cluster with respect to a particular VM type indicates an amount of VMs of that type that the computing cluster could deploy if dedicated to that VM type alone. For illustrative purposes, consider a scenario where a computing cluster has four individual computing devices each with twenty processor cores installed therein. For this cluster, the system may determine a first maximum capacity with respect to a first VM type that requires eight processor cores as well as a second maximum capacity with respect to a second VM type that requires only two processor cores. The first maximum capacity of the computing cluster would be eight since each individual computing device can deploy two of the first VM type and would then have four unused processor cores. The second maximum capacity of computing cluster would be forty since each of the four individual computing devices can deploy ten of the second VM type and would then have no unused processor cores.

In some configurations, the techniques disclosed herein also enable the system to analyze operational states of the computing cluster at various times to determine the actual remaining capacities (ARCs) of the computing cluster. In some embodiments, individual ARCs correspond to individual VM types and/or individual computing devices of the computing cluster. For example, as will be discussed in more detail with respect to FIG. 1A, the system may analyze a first operational state of the computing cluster to determine that a first device has one remaining unit of a particular physical resource, a second device has six remaining units, a third device has four remaining units, and a fourth device has nine remaining units. Then, with respect to a VM type that requires an allocation of two units of the physical resource, the system may determine that the ARC of the first device is a zero since the first device does not have enough remaining units to deploy the VM type needing two units, the ARC of the second device is a three since its six remaining units can be used to deploy three of the VM type needing two units, etc. Then, as will be discussed in more detail with respect to FIG. 1B, at some subsequent time the system may analyze a second operational state of the computing cluster to determine that, with respect to the VM type needing two units, the ARC of the first device is still zero, the ARC of the second device is one, the ARC of the third device is two, and the ARC of the fourth device is four. Furthermore, it will become apparent that this analysis discussed with respect to the first operational state and the second operational state can also be performed for a plurality of other VM types, e.g. a VM type requiring only one unit of the physical resource and another VM type requiring four units and yet another VM type requiring eight units.

In some configurations, the techniques disclosed herein enable the system to compare first ARCs determined by analyzing a first operational state of a computing cluster to second ARCs determined by analyzing a second operational state of the computing cluster. Based on this comparison and/or physical resource allocation flux that was monitored for the computing cluster, the system may then generate and/or update VM type exchange probabilities associated with that computing cluster. For example, the system may be configured to construct a solvable function in which the VM type exchange probabilities are designated as unknowns to be solved for and in which the first and second ARCs and/or the physical resource allocation flux are designated as knowns. In some configurations, the system may be configured to continually monitor the physical resource allocation flux at the VM type level. For example, the system may continually monitor the commissioning of particular VM types into a computing cluster (e.g. causing the computing cluster to begin executing ones of the particular VM types) as well as the decommissioning of the particular VM types out of the computing cluster (e.g. causing the computing cluster to stop executing ones of the particular VM types). The system may further be configured to periodically analyze the computing cluster to determine additional sets of ARCs that correspond to successive operational states of the computing cluster. ARCs may be determined for the computing cluster every one hour, every two hours, every four hours, or any other regular or irregular interval. Then, as the system continually gathers additional "knowns" type data, the VM type exchange probabilities may be continually updated for use in generating increasingly accurate estimated remaining capacities (ERCs).

In some configurations, the techniques disclosed herein enable the system to continually generate ERCs by incrementing (or decrementing) ARCs, that were determined with respect to a particular VM type, based VM type exchange probabilities corresponding to the particular VM type and to VMs that are decommissioned (or commissioned) from the computing cluster. For example, consider a scenario where a computing cluster supports a first VM type that requires eight processor cores and a second VM type that requires four processor cores. In such a scenario, if one of the first VM type is successfully commissioned into the computing cluster then the system may know that the computing cluster's capacity with respect to the first VM type is decreased by one since the eight processor cores allocated to the commissioned first VM type can no longer be allocated to another VM of the first type. The system may further know that the computing cluster's capacity with respect to the second VM type is decreased by two since the eight processor cores allocated to the newly commissioned first VM type can no longer be allocated to two VMs of the second type.

Considering the same computing cluster, suppose now that one of the second VM type is successfully commissioned into the computing cluster. Here, the system knows that a result of commissioning the second VM type is that the computing cluster's capacity with respect to the second VM type is decreased by one. However, since the system may not know the precise arrangement of VM instances within the cluster, the system guesses whether the computing cluster's capacity with respect to the first VM type is decreased at all or whether the VM was commissioned onto a computing device within the cluster which had seven or less available processor cores. Thus, as the VM type exchange probabilities indicate a likelihood that commissioning/decommissioning a specific VM type into the computing clusters will take-up/free-up computing resources available to other VM types, the system may utilize the VM type exchange probabilities that correspond to the second VM type to estimate whether the commissioning of the second VM type took up resources that could have been used to deploy a VM of the first type. Stated plainly, the VM type exchange probabilities corresponding to the second VM type may indicate a likelihood that the second VM type was placed in a space large enough to fit the first VM type.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicates similar or identical items.

References made to individual items of a plurality of items can use a reference number followed by a parenthetical containing a letter of a sequence of letters to refer to each individual item. Generic references to the items may use the specific reference number without the sequence of letters.

References made to individual item types of a plurality of item types can use a reference number followed by a parenthetical containing a number of a sequence of numbers (e.g. "1", "2", etc.) to refer to each individual item type (e.g. "1" denoting a first item type, "2" denoting a second item type, etc.). Generic references to the items, e.g. as opposed to references to specific types of the items, may use the specific reference number without the sequence of numbers.

Figure 1A:
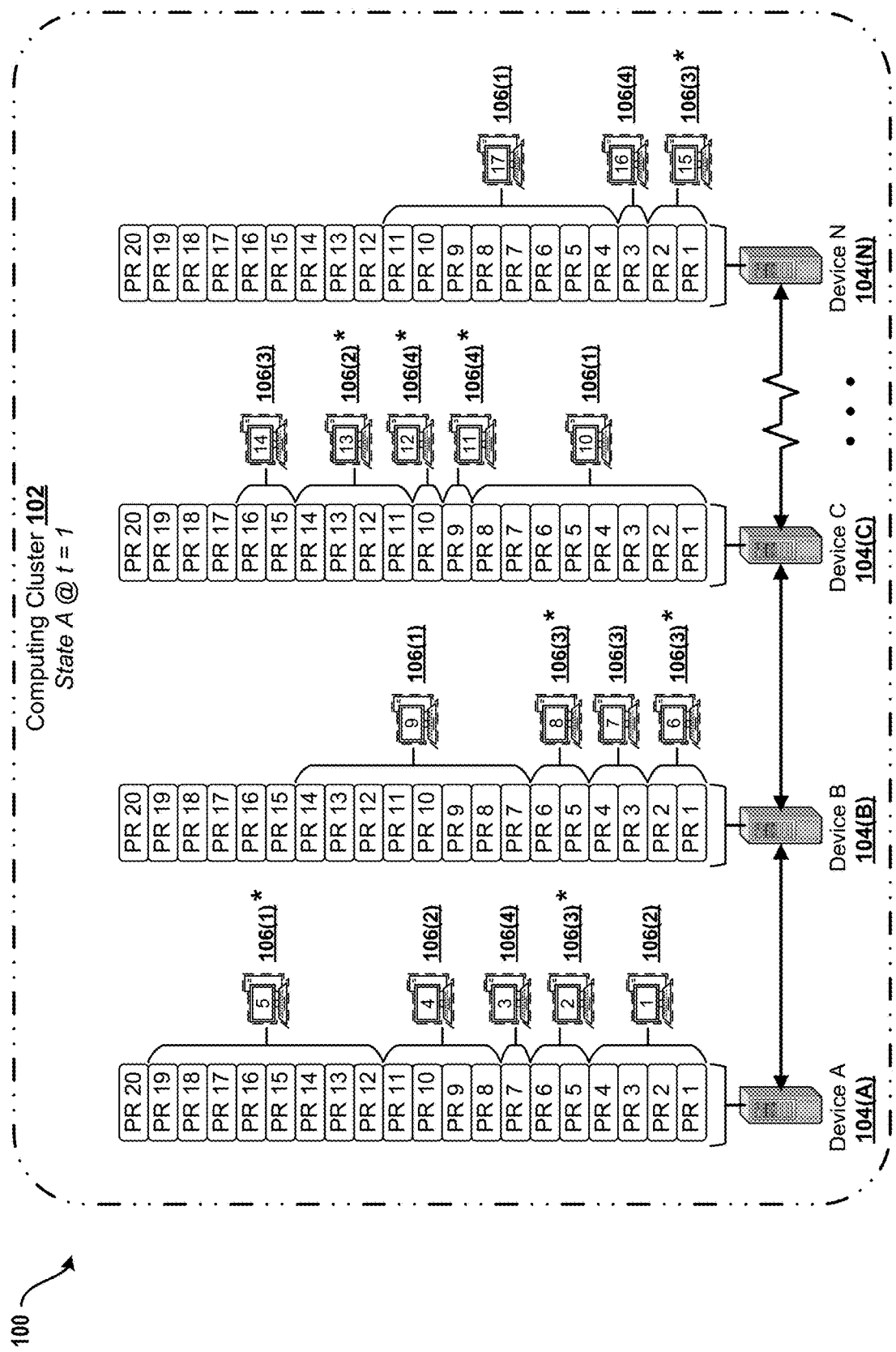
FIG. 1A illustrates a operational state of a virtualization system deploying numerous virtual machines (VMs) on a cluster of computing devices that each have an amount of physical computing resources installed therein.
Figure 1B:
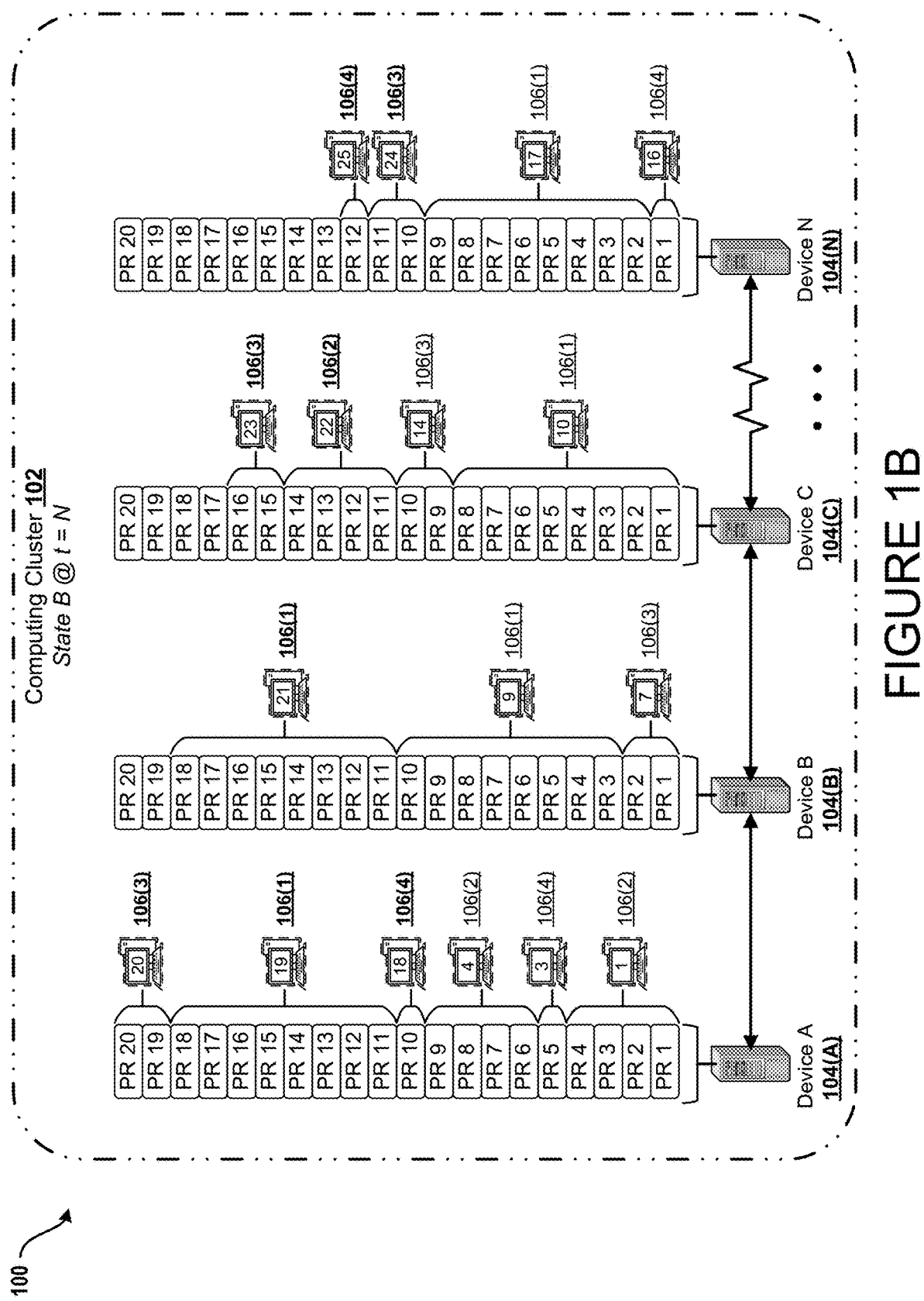
FIG. 1B illustrates a subsequent operational state of the virtualization system of FIG. 1A deploying some but not all of the VMs of FIG. 1A as well as some additional VMs not deployed during the operational state of FIG. 1A.
Figure 1C:
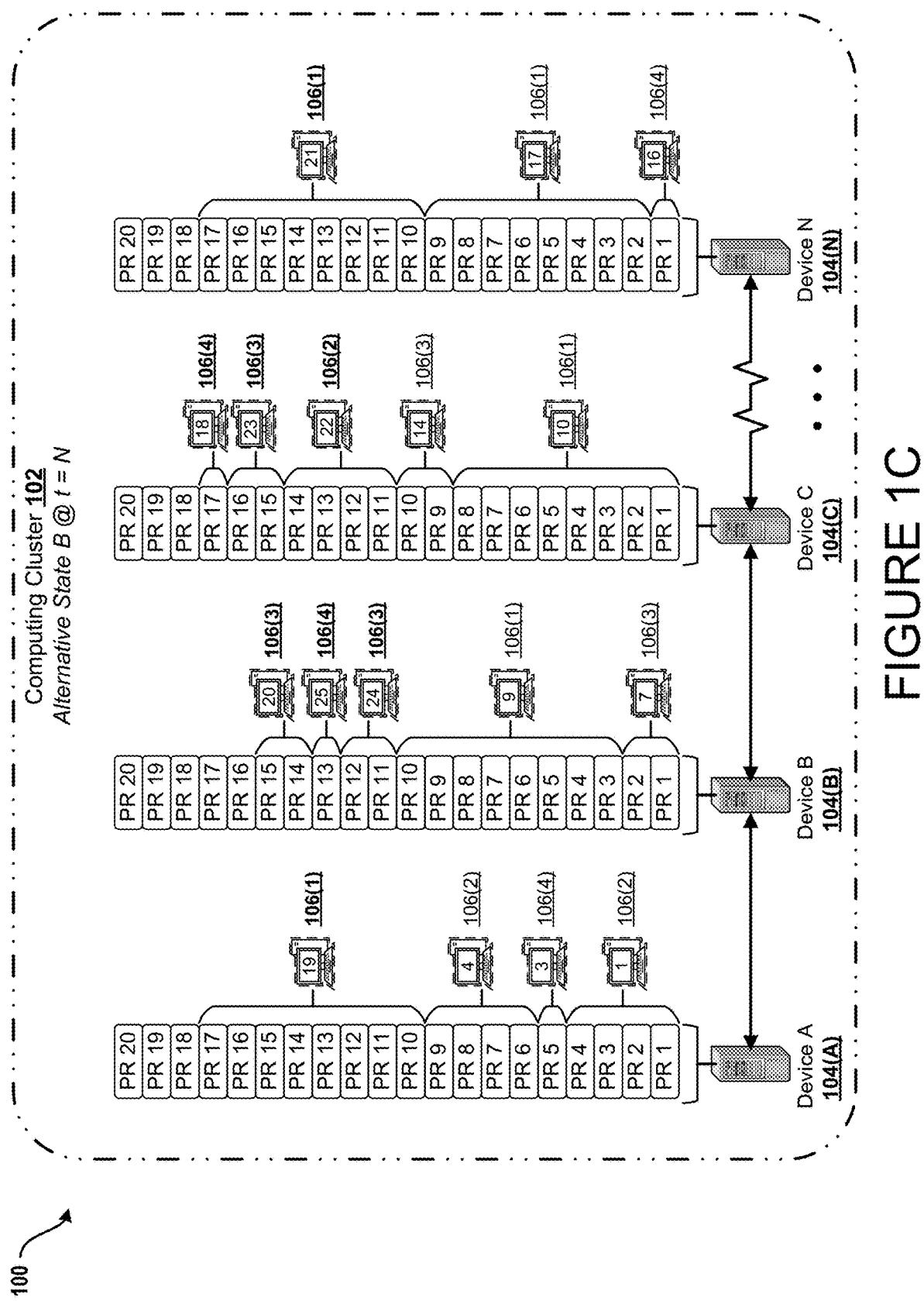

FIG. 1C illustrates an alternate subsequent operational state of the virtualization system of FIG. 1A deploying the same VMs shown in FIG. 1B in an alternate arrangement as compared to FIG. 1B. Stated alternatively, FIG. 1B and FIG. 1C correspond to the same VMs being decommissioned from the cluster and the same VMs being commissioned into the computing cluster but in varying arrangements, e.g. individual VMs being commissioned onto different ones of the computing devices.

Figure 2:
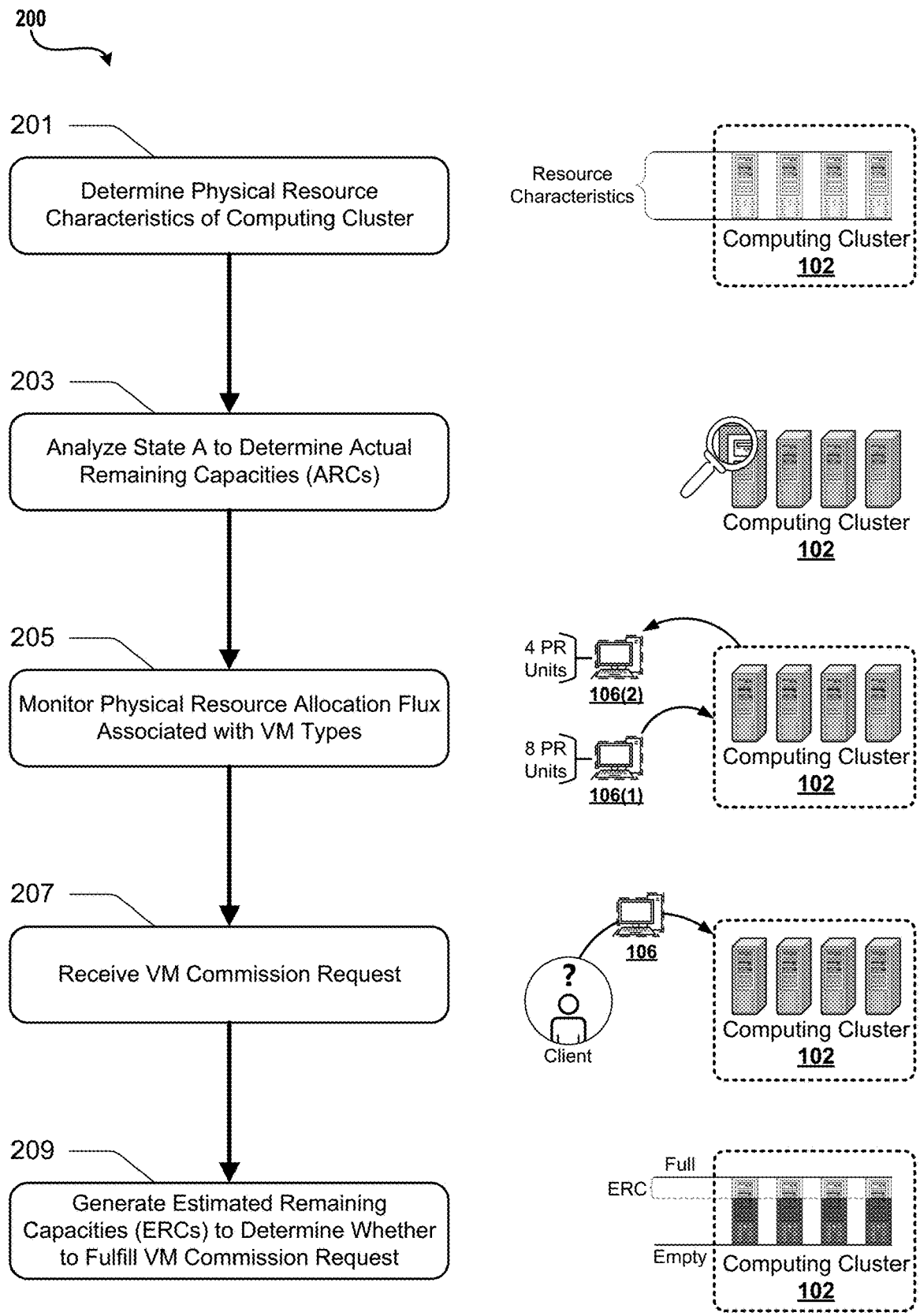

FIG. 2 is a pictorial flow diagram that shows an illustrative process of generating estimated remaining capacities (ERCs) to determine whether to fulfill requests to commission VMs into a computing cluster.

Figure 3:
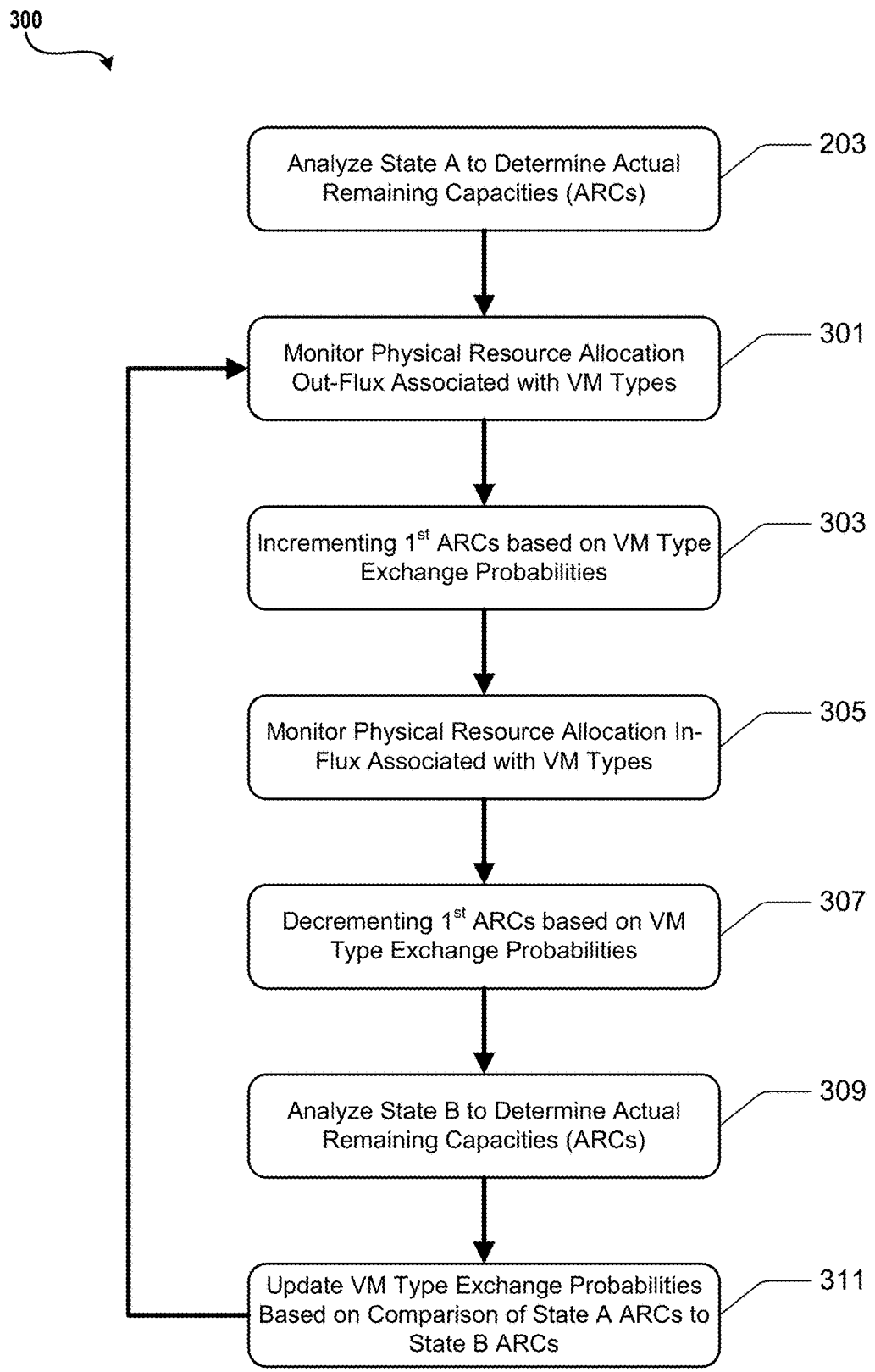

FIG. 3 is a flow diagram of an illustrative process of generating ERCs based on VM type exchange probabilities and also updating the VM type exchange probabilities based on actual remaining capacities (ARCs) observed at two or more operational states of a computing cluster.

Figure 4:
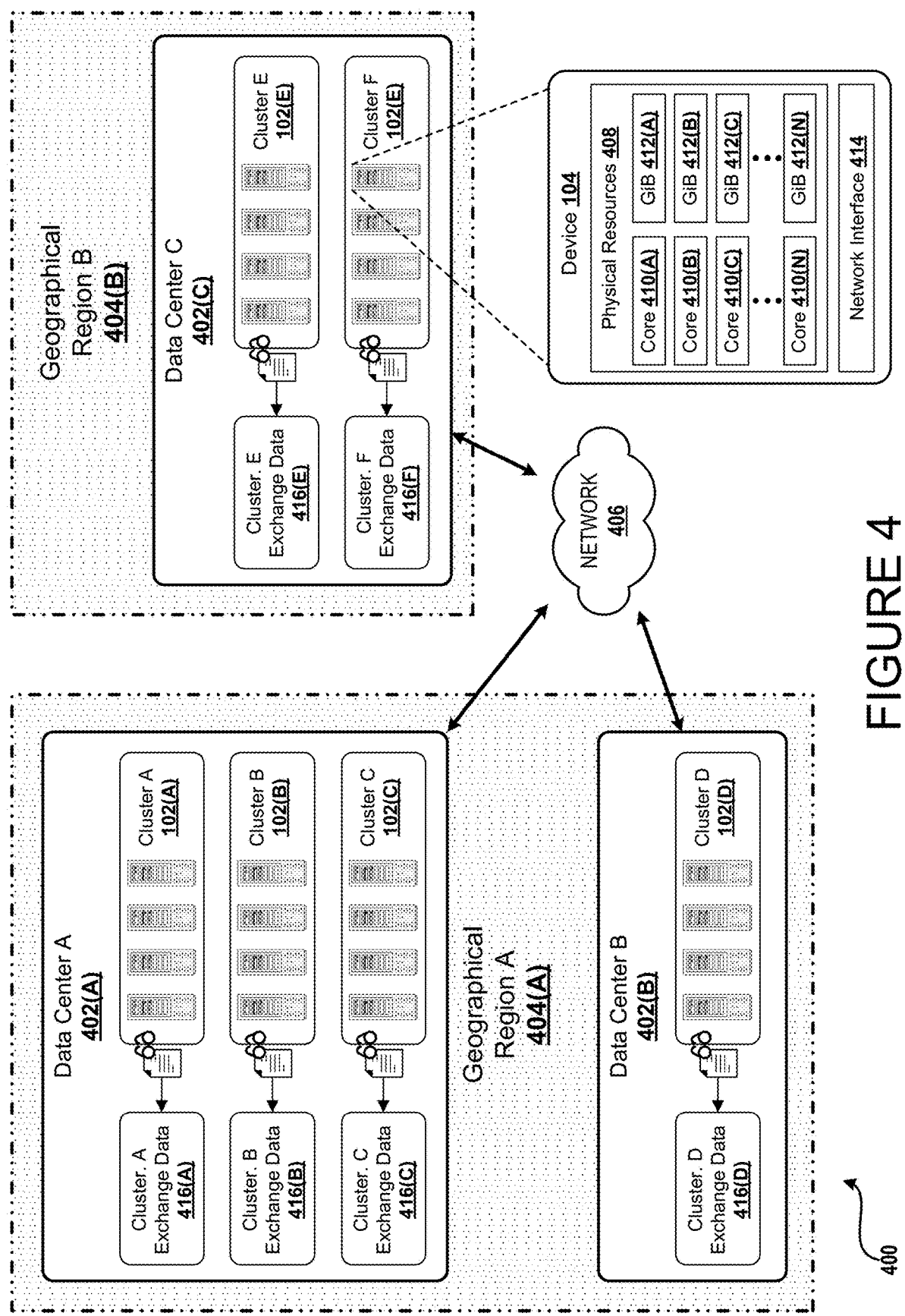

FIG. 4 is an illustrative virtualization system architecture that includes multiple data centers distributed across multiple geographical regions with each data center including one or more clusters of computing devices that have finite amounts of physical computing resources installed therein.

Figure 5:
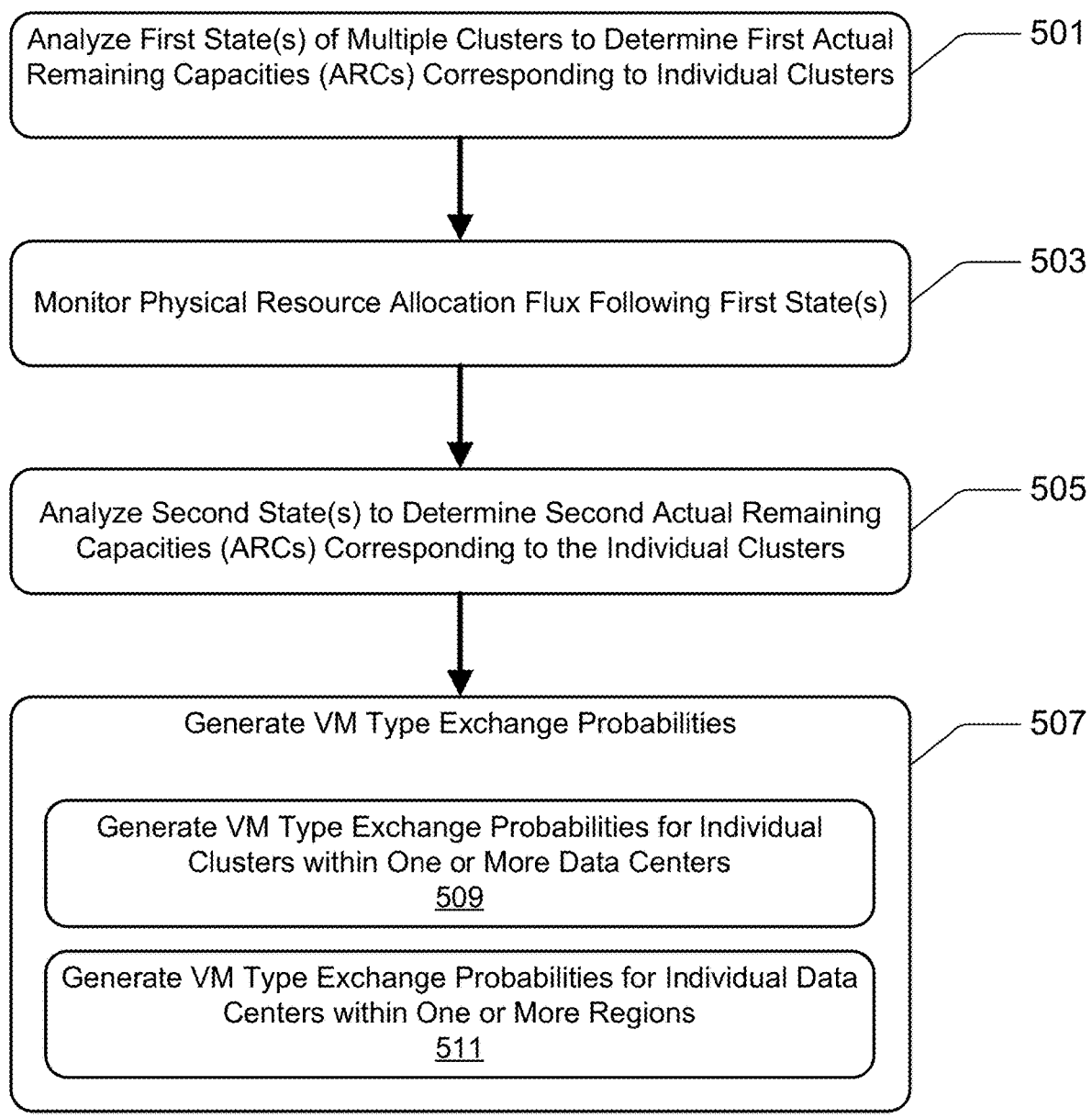

FIG. 5 is a flow diagram of an illustrative process of analyzing subsequent operational states of multiple computing clusters to determine ARCs corresponding to individual ones of the multiple clusters to generate associated VM type exchange probabilities.

Figure 6:
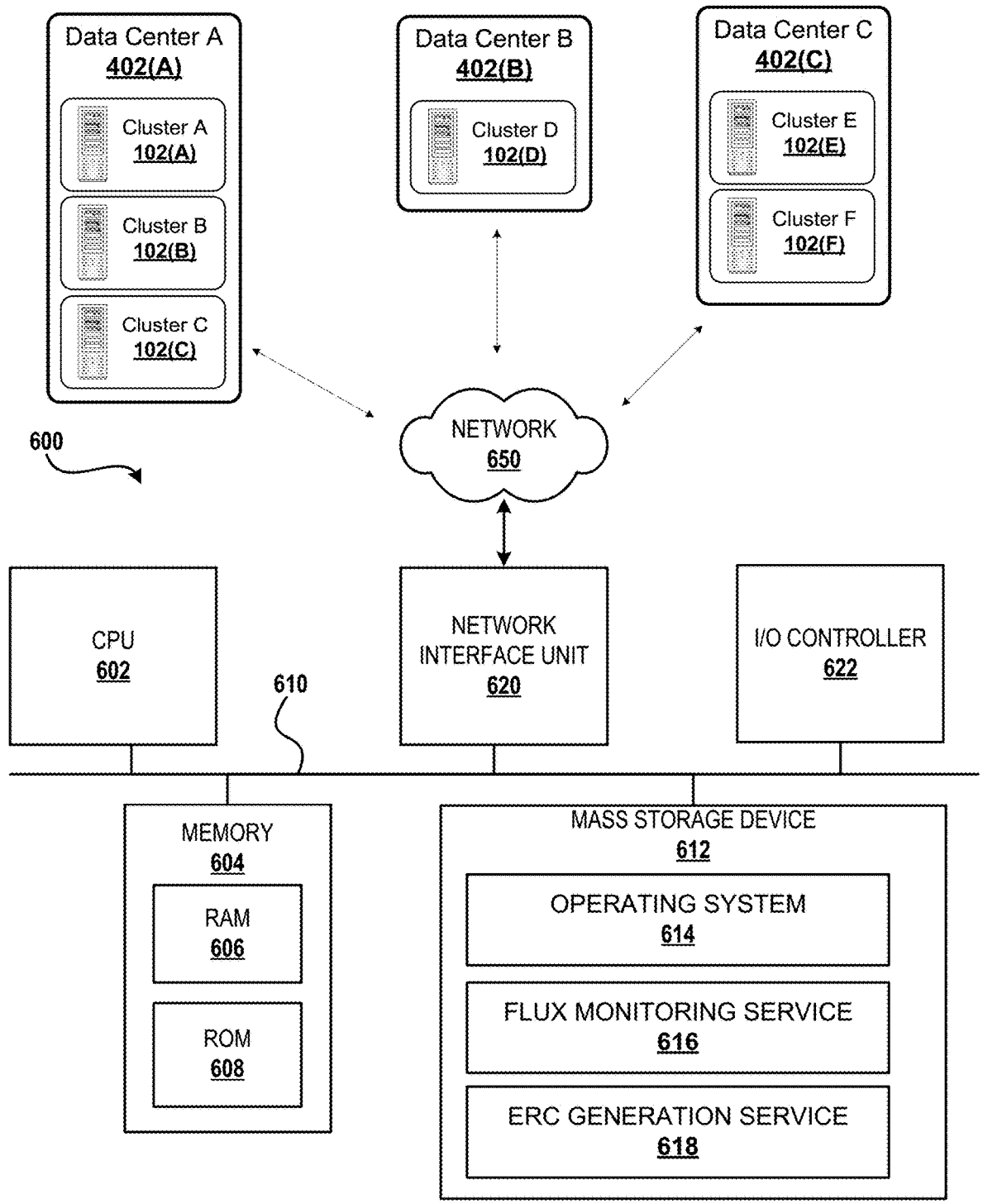

FIG. 6 shows additional details of an example computer architecture for a computer capable of executing the functionalities described herein.

Figure 7:
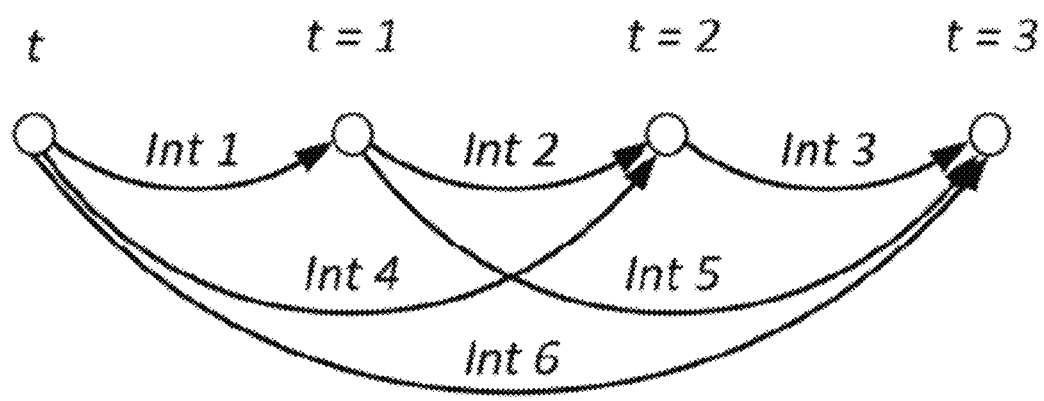

FIG. 7 illustrates a chart that graphically represents aspects of Equation 4 as described herein.

DETAILED DESCRIPTION

The following Detailed Description describes technologies for predicting current and/or future capacity of shared virtual machine (VM) resources. Generally described, configurations disclosed herein enable a system to generate estimated remaining capacities (ERCs) for computing clusters within a virtualization system rather than continuously monitoring actual remaining capacities (ARCs) of the computing clusters. As described above, monitoring a physical resource allocation flux at the computing cluster level is substantially less costly than monitoring how physical resources are allocated at the individual computing device level, e.g. monitoring ARCs. Accordingly, to provide benefits over continuously monitoring ARCs of individual computing devices and/or individual computing clusters, techniques disclosed herein enable a computing system to generate ERCs for computing clusters by using physical resource allocation flux data and/or VM type exchange probabilities. The physical resource allocation flux data may correspond to VMs being commissioned into and decommissioned out of the computing clusters. The physical resource allocation flux data may be obtained during a blind period in which the system reserves computing resources by not actively monitor ARCs or during which the system is unable to determine precise arrangements of VM instances within a computing cluster. The VM type exchange probabilities may indicate a likelihood that commissioning or decommissioning a specific VM type into the computing cluster(s) will take up or free up computing resources available to other VM types, respectively.

For illustrative purposes, consider a scenario where a computing cluster is configured to deploy various types of VMs that require allocations of varying amounts of physical resources. Due to the wide array of applications for which businesses deploy VMs, VM service providers typically offer a wide array of VM types that have various configurations with respect to physical computing resource allocations. For example, a VM service provider may offer a first VM type that receives an allocation of eight central processing unit (CPU) cores, a second VM type that receives an allocation of four CPU cores, a third VM type that receives an allocation of two CPU cores, and a fourth VM type that receives an allocation of only one CPU core. The VM types may also vary in terms of other physical computing resources such as, for example, unit amounts of allocated memory and/or unit amounts of allocated hard disk storage space and/or allocated network bandwidth capacities. Accordingly, VM types may be defined in terms of one or more physical computing resources whether described herein or not. As a practical matter, however, CPUs tend to be relatively costly compared to other physical computing resources which leads VM service providers to design computing devices to become CPU constrained as opposed to being constrained by other physical computing resources. Accordingly, various portions of this detailed description use CPUs as an exemplary physical resource to monitor an allocation flux of to deploy the techniques described herein.

Continuing with this scenario, if an instance of the second VM type is commissioned into a cluster at a computer having eight or nine units of the physical resources available, then the second VM type will have taken up computing resources that could have been used to deploy an instance of the first VM type. In contrast, if the instance of the second VM type is commissioned into the cluster at a different computer having seven or less units of the physical resource available, then instance of the second VM type will have taken up computing resources that could not have been used to deploy an instance of the first VM type since each VM instance must reside on a single computing device. For example, that computer couldn't have fit an additional instance of the first VM type since it only had seven or less units of the physical resource available. It can be appreciated then that precisely where individual VM instances are executed within a cluster of computing devices can have varying impacts on the cluster's remaining capacity with respect to various VM types. Without continuously monitoring ARCs for the cluster, the system may be unable to determine with certainty the cluster's ability to deploy additional instances of the individual VM types. Therefore, difficulties exist with respect to determining whether to grant or deny client requests to commission new on demand VMs into a virtualization system and/or computing clusters thereof or to accept a reservation request to reserve computing resources for future use. The present disclosure mitigates these and other difficulties by providing aspects of a system for generating estimated remaining capacities (ERCs) of physical resources within a computing cluster and, based thereon, determining whether to fulfill requests to commission VMs into the computing cluster.

To illustrate aspects of the techniques disclosed herein, FIGS. 1A-1C illustrate various operational states of a virtualization system deploying numerous VMs on a cluster of computing devices that each of an amount of discreetly installed physical computing resources. As illustrated in FIGS. 1A-1C, the virtualization system 100 includes a computing cluster 102 that is configured to simultaneously deploy a plurality of VM instances of a plurality of VM types. Individual VM instances are deployed on individual computing devices 104 of the computing cluster 102. For example, as illustrated the individual VM instances are not split into parts that are deployed on different ones of the computing devices 104. Although the computing cluster 102 may include any number of computing devices 104, for purposes of this disclosure the computing cluster 102 includes four computing devices, e.g. device A 104(A), device B 104(B), device C 104(C), and device N 104(N). As further illustrated in FIGS. 1A-1C, each of these four computing devices include a finite amount physical resource units installed therein with each physical resource unit (PRU) being individually labeled with the designation "PR" followed by a corresponding unit number. For example, device A 104(A) is shown to include 20 discreetly installed units of a physical resource with individual units being labeled "PR 1"-"PR 20."

The physical resource units of any particular computing device 104 are allocated to instances of various VM types 106 that are being executed on that particular computing device 104. Although the computing cluster 102 may be configured to deploy any number of various VM types 106, for purposes of this disclosure the computing cluster 102 deploys four different VM types 106 that are defined by a number of physical resource units that each requires allocation of to be deployed. In particular, the four different VM types 106 include a first VM type 106(1) that requires an allocation of eight physical resource units (PRUs), a second VM type 106(2) that requires an allocation of four PRUs, a third VM type 106(3) that requires an allocation of two PRUs, and finally a fourth VM type 106(4) that requires an allocation of one PRU. At any given time, individual ones of the computing devices 104 may have a certain remaining capacity with respect to individual ones of the VM types 106. For example, a particular computing device 104 may possess enough unallocated PRUs to deploy a particular number of instances of a particular VM type 106.

Referring now specifically to FIG. 1A, at time t=1 which corresponds to operational state A, computing device A 104(A) is executing five different VM instances. Each VM instance is depicted as a desktop computing device and each VM instance is uniquely numbered on the monitor of the desktop computing device. For example, the five different VM instances being executed on computing device A 104(A) are labeled 1-5, the four different VM instances being executed on computing device B 104(B) are labeled 6-9, etc. For purposes of this discussion, each illustrated VM instance will be referred to by its instance number as designated by the monitor of the desktop computing device icon (e.g. computing device 104(A) is executing VM 1, VM 2, VM 3, etc.). Furthermore, each VM instance is also designated by VM type 106. For example, VM 1 is an instance of the second VM type 106(2) and, therefore, requires an allocation of four PRUs.

In some embodiments, the cluster 102 may be configured to periodically emit data usable to determine ARCs of the cluster 102. For example, the cluster 102 may emit data indicating characteristics of operational state A of FIG. 1A that is usable to construct Table 1 which indicates ARCs corresponding to cluster 102 at operational state A. For example, Table 1 indicates a remaining capacity of each of the individual computing devices 104 with respect to each of the individual VM types 106. As illustrated in FIG. 1A, at operational state A the computing device A 104(A) only has a single unallocated PRU since the remaining other 19 PRUs are already allocated to the execution of VM 1 through VM 5. Accordingly, at t=1 computing device A 104(A) has an ARC of zero with respect to VM types 106(1)-106(3) and an ARC of 1 with respect to VM type 106(4). Furthermore, with specific reference to the fourth VM type 106(4), computing device B 106(B) has an ARC of 6 due to its 6 unallocated PRUs, computing device C 106(C) has an ARC of 4 due to its 4 unallocated PRUs, and computing device N 106(N) has an ARC of 9 due to its 9 unallocated PRUs. Therefore, at t=1 the cluster 102 has an ARC of 20 with respect to the fourth VM type 106(4).

TABLE 1

(Corresponds to FIG. 1A): ARCs for Cluster
102 @ Operational State A

| | Device A 104(A) | Device B 104(B) | Device C 104(C) | Device N 104(N) | Cluster Total ARC per VM Type |
|---|---|---|---|---|---|
| 1$^{st}$ VM Type 106(1) | 0 | 0 | 0 | 1 | 1 |
| 2$^{nd}$ VM Type 106(2) | 0 | 1 | 1 | 2 | 4 |
| 3$^{rd}$ VM Type 106(3) | 0 | 3 | 2 | 4 | 9 |
| 4$^{th}$ VM Type 106(4) | 1 | 6 | 4 | 9 | 20 |

As described above, however, operational states of the computing cluster 102 are highly dynamic in the sense that individual VM instances are continuously being commissioned into and decommissioned out of the computing cluster 102. Accordingly, despite the cluster 102 periodically emitting data usable to determine ARCs of the computing cluster 102 with respect to the individual VM types 106 (e.g. data usable to construct Table 1), such determinations may quickly become stale as the computing cluster 102 ceases to execute the existing VM instances and begins to execute new VM instances. For illustrative purposes, several VM instances shown in FIG. 1A are further designated with an asterisk (e.g. VM 2, VM 5, VM 6, etc.) to indicate that the computing cluster 102 ceases to execute these specific VM instances after t=1 which corresponds to FIG. 1A and prior to t=N which corresponds to FIGS. 1B-1C.

Turning now to FIG. 1B, at time t=N which corresponds to operational state B the computing cluster 102 is deploying some but not all of the VMs of FIG. 1A as well as some additional VMs not deployed during the operational state of FIG. 1A. In particular, each of the VM instances designated with an asterisk in FIG. 1A are no longer being executed by the computing cluster at time t=N. Moreover, at time t=N the computing cluster 102 is executing numerous additional VM instances that were not previously being executed at time t=1, i.e. VM 18-VM 25. Here, the VM instances which were being executed in FIG. 1A are labeled in non-bold font whereas the VM instances commissioned after time t=1 are labeled in bold font.

As described above, it can be costly in terms of computing resources to actively monitor the computing cluster's 102 ARCs by, for example, actively determining from which individual computing devices 104 individual VM instances are decommissioned from and onto which individual computing devices 104 individual VM instances are commissioned onto. It is relatively less computationally intensive to monitor the physical resource allocation flux of the computing cluster 102. Accordingly, although the system may monitor amounts of VM instances by individual VM type 106 being commissioned into or decommissioned out of the computing cluster 102, the system may be unable to discern an arrangement of those VM instances within the computing cluster 102, e.g. on which individual computing devices 104 the individual VM instances are being executed.

A comparison of FIG. 1B to FIG. 1C may be helpful to illustrate this point. In particular, FIG. 1C illustrates an alternate arrangement within the computing cluster 102 of the same VM instances shown in FIG. 1B. Stated alternatively, FIG. 1B and FIG. 1C correspond to the same VMs designated by the asterisks in FIG. 1A being decommissioned from the cluster and the same VMs 18-25 being commissioned into the computing cluster. Thus, the only difference between FIG. 1B and FIG. 1C is the arrangement of VMs 18-25 within the computing cluster 102. For example, with specific reference to the new VM instances on computing device A 104(A), in FIG. 1B this device is executing VM 18, VM 19, and VM 20, whereas in FIG. 1C the same device is executing only VM 19. Although the system may know how many instances of each VM type 106 are being executed by the computing cluster 102 based on its monitoring of the physical resource allocation flux, the arrangements of these instances within the computing cluster 102 are controlled by a separate and highly complex VM instance placement algorithm and therefore may remain unknown to the system.

As a result of the potential for varied arrangements of the VM instances within the computing cluster 102, the system may be unable to precisely discern the remaining capacities of the computing cluster 102 after the cluster 102 emits data as described above with respect to table 1. For example, the system may be unable to discern whether the remaining capacities of the computing cluster 102 correspond to the arrangement of VM instances shown in FIG. 1B or the alternate arrangement of the same VM instances shown in FIG. 1C. Table 2 is similar to Table 1 but represents Remaining Capacities of the computing cluster 102 that would result is the VM instances happen to become arranged as shown in FIG. 1B. This is, however, only one of numerous possible arrangements of the illustrated VM instances.

TABLE 2

(Corresponds to FIG. 1B): Remaining Capacities
for Cluster 102 @ Operational State B

| | Device A 104(A) | Device B 104(B) | Device C 104(C) | Device N 104(N) | Cluster Total ARC per VM Type |
|---|---|---|---|---|---|
| 1$^{st}$ VM Type 106(1) | 0 | 0 | 0 | 1 | 1 |
| 2$^{nd}$ VM Type 106(2) | 0 | 0 | 1 | 2 | 3 |
| 3$^{rd}$ VM Type 106(3) | 0 | 1 | 2 | 4 | 7 |
| 4$^{th}$ VM Type 106(4) | 0 | 2 | 4 | 8 | 14 |

Similarly, Table 3 is similar to Table 1 but represents Remaining Capacities of the computing cluster 102 that would result is the VM instances happen to become arranged as shown in FIG. 1C.

TABLE 3

(Corresponds to FIG. 1C): Remaining Capacities for Cluster
102 @ Alternate Operational State B

| | Device A 104(A) | Device B 104(B) | Device C 104(C) | Device N 104(N) | Cluster Total ARC per VM Type |
|---|---|---|---|---|---|
| 1$^{st}$ VM Type 106(1) | 0 | 0 | 0 | 0 | 0 |

TABLE 3-continued (Corresponds to FIG. 1C): Remaining Capacities for Cluster 102 @ Alternate Operational State B

| | Device A 104(A) | Device B 104(B) | Device C 104(C) | Device N 104(N) | Cluster Total ARC per VM Type |
|---|---|---|---|---|---|
| 2$^{nd}$ VM Type 106(2) | 0 | 1 | 0 | 0 | 1 |
| 3$^{rd}$ VM Type 106(3) | 1 | 2 | 1 | 1 | 5 |
| 4$^{th}$ VM Type 106(4) | 3 | 5 | 3 | 3 | 14 |

With consideration to the foregoing discussion of FIGS. 1A-1C, it can be appreciated that commissioning and/or decommissioning a particular VM type into the computing cluster may disproportionately impact the computing cluster's remaining capacity with respect to other VM types that require relatively less PRUs to be deployed. For example, if an instance of the first VM type 106(1) is commissioned into the computing cluster 102, then the remaining capacity of that computing cluster 102 with respect to the fourth VM type 106(4) will be decreased by eight, i.e. the 8 PRUs allocated to the instance of the first VM type 106(1) are no longer available to deploy 8 of the fourth VM type 106(4). On the other hand, if an instance of the fourth VM type 106(4) is commissioned into the computing cluster 102, then the cluster's remaining capacity with respect to the first VM type 106(1) may or may not be decreased. These so-called "VM Type Exchange Rates" can be represented in the form of a lookup table that for each VM type contains corresponding exchange rates to any other individual VM type associated with a cluster.

In the present example, Table 4 represents the VM Type Exchange Rates each of VM Types 106(1)-106(4) with respect to each of VM Types 106(1)-106(4). In Table 4, the cell values represent a ratio of the amount of PRUs that will be taken up (or freed up) for the row Y VM Types with respect to the column X VM Types being commissioned (or decommissioned). With reference to the bold and underlined cell value, this cell value indicates that if an instance of the third VM Type 106(3) is commissioned into the computing cluster 102 then one-half of the amount of PRUs needed to commission an instance of the second VM Type 106(2) will be taken up. Stated alternatively, the two PRUs allocated to the commissioned instance of the third VM type 106(3) is equal to half of the four PRUs that would be needed to commission an instance of the second VM type 106(2). Another way to conceptualize Table 4 is to consider its cell values to represent how many VM's of type "Y" would fit into the PRU space needed to execute a VM of type "X."

TABLE 4

VM Type Exchange Rates for VM Types 106(1)-106(4)

| | Y | | | |
|---|---|---|---|---|
| X | 1$^{st}$ VM Type 106(1) | 2$^{nd}$ VM Type 106(2) | 3$^{rd}$ VM Type 106(3) | 4$^{th}$ VM Type 106(4) |
| 1$^{st}$ VM Type 106(1) | 1 | 2 | 4 | 8 |
| 2$^{nd}$ VM Type 106(2) | 0.5 | 1 | 2 | 4 |
| 3$^{rd}$ VM Type 106(3) | 0.25 | 0.5 | 1 | 2 |
| 4$^{th}$ VM Type 106(4) | 0.125 | 0.25 | 0.5 | 1 |

With further consideration to the foregoing discussion of FIGS. 1A-1C, it can also be appreciated that commissioning and/or decommissioning a particular VM type into the computing cluster might have no impact on the cluster's capacity to deploy additional instances of the other VM types. For example, with specific reference to FIG. 1C, if an additional instance of a third VM type is commissioned onto any one of computing device's 104(A), 104(C), or 104(N), there will be no effect on the cluster's capacity with respect to VM Types 106(1) and 106(2). On the other hand, if the additional instance of the third VM type is commissioned onto a computing device 104(B), then there will be no effect on the cluster's capacity with respect to the first VM type 106(1) but the cluster's capacity with respect to the second VM type 106(2) will decrease by one. These so-called "VM Type Exchange Probabilities" can be represented in the form of a lookup table that for each VM type contains corresponding exchange probabilities to any other individual VM type associated with a cluster.

In the present example, Table 5 represents the VM Type Exchange Probabilities for each of VM Types 106(1)-106(4) with respect to each of VM Types 106(1)-106(4). In Table 5, the cell values represent a likelihood that the column X VM Types being commissioned (or decommissioned) will affect the cluster's remaining capacity with respect to the row Y VM Types. With reference to the bold and underlined cell value, this cell value indicates that commissioning an instance of the second VM Type 106(2) into the computing cluster 102 has a 100% chance of affecting the cluster's remaining capacity to execute additional instances of the third VM type 106(3). Stated alternatively, the four PRUs allocated to the commissioned instance of the second VM type 106(2) could certainly have been used to deploy two instances of the third VM type 106(3). This is because each third VM type needs two PRUs located on the same computing device and a commissioned instance of the second VM type takes up four PRUs located on the same computing device.

Another way to conceptualize Table 5 is to consider its cell values to represent the probability that commissioning a VM of type "X" will affect the cluster's remaining capacity to execute additional type "Y" VM instances. With reference to the bold and italicized cell value, this cell value indicates the probability that commissioning an instance of the third VM Type 106(3) into the computing cluster 102 will affect the cluster's remaining capacity to execute additional instances of the second VM type 106(2). Due to the possibility that an instance of the third VM Type 106(3) could be commissioned onto a computing device having only two or three PRUs available, the system knows that the value of P[VM₃, VM₂] is less than one. For example, with specific reference to FIG. 1C, if an additional instance of a third VM type is commissioned onto any one of computing device's 104(A), 104(C), or 104(N), there will be no effect on the cluster's capacity with respect to VM Type 106(2).

TABLE 5

VM Type Exchange Probabilities for VM Types 106(1)-106(4)

|  | Y | | | |
|---|---|---|---|---|
| X | 1ˢᵗ VM Type 106(1) | 2ⁿᵈ VM Type 106(2) | 3ʳᵈ VM Type 106(3) | 4ᵗʰ VM Type 106(4) |
| 1ˢᵗ VM Type 106(1) | 1 | 1 | 1 | 1 |
| 2ⁿᵈ VM Type 106(2) | P[VM₂, VM₁] | 1 | 1 | 1 |
| 3ʳᵈ VM Type 106(3) | P[VM₃, VM₁] | *P[VM₃, VM₂]* | 1 | 1 |
| 4ᵗʰ VM Type 106(4) | P[VM₄, VM₁] | P[VM₄, VM₂] | P[VM₄, VM₃] | 1 |

Accordingly, because the system knows that larger VM types will always take up PRUs that would otherwise be available to smaller VM types, the system knows that the upper half of Table 5 will have cell values of P=1. In contrast, because the system knows that smaller VM types may or may not take up PRUs that would otherwise be available to larger VM types, the system knows that the remaining values of Table 5 will have cell values of P<1. Although the cell values may be initially unknown, techniques of the present disclosure provide for generating and/or solving for these unknown VM type exchange probabilities. For example, these values may be solved for by constructing an Exchange Probability Function in which these values are designated as unknowns. An exemplary Exchange Probability Function may be:

$$AS_i = \sum_{j=1}^{n} E[S_j, S_i]P[S_j, S_i]dS_j \quad \text{(Eq. 1)}$$

where $AS_i$ is the change in actual remaining capacity (ARC) of the cluster for VM Type $S_i$ over some time interval t=1 through t=N; $E[S_j, S_i]$ is the VM Type Exchange Rate from VM type $S_j$ to VM type $S_i$ as represented by Table 4; $P[S_j, S_i]$ is the VM Type Exchange Rate Probability from VM type $S_j$ to VM type $S_i$ as represented by Table 5; and $dS_j$ is net number of instances of VM type $S_j$ that were commissioned/decommissioned from the cluster over time interval t=1 through t=N. As the amount of PRUs allocated to each instance of VM type $S_j$ is a known, it can be appreciated that dSj may be represented in terms of a physical resource allocation flux of the cluster that indicates how physical resources are allocated within a computing cluster by VM type.

It is worth noting that equation 1 assumes that the maximum capacity of the computing cluster remains constant over time interval t=1 through t=N. However, in practice the maximum capacity of the computing cluster with respect to the various VM types may change over the time interval due to environmental changes to the cluster such as, for example, individual ones of the computing devices going off-line for coming back online and/or additional computing devices being added to the cluster. To account for such environmental changes another exemplary Exchange Probability Function may be:

$$AS_i = \sum_{j=1}^{n} E[S_j, S_i]P[S_j, S_i]dS_j + MS_i \quad \text{(Eq. 2)}$$

where $MS_i$ is the change in the maximum capacity of the cluster for with respect to VM Type Si over time interval t=1 through t=N. Accordingly, all other things remaining constant, increases to the maximum capacity of the cluster over a particular time interval will result in increases to the actual remaining capacity as observed across that time interval.

It can be appreciated that in equation 1 and equation 2, the VM Type Exchange Rates (e.g. $E[S_j, S_i]$) remain constant whereas each of the ARC changes of the cluster (e.g. $AS_i$), the changes in the maximum capacity of the cluster (e.g. $MS_i$), and the net number of VM instances by type (e.g. $dS_j$) all potentially vary over time. Furthermore, because the top half of Table 5 contains "knowns" such that only the bottom half need be solved for (i.e. the top half is known to have P=1), there are only n−i variables for each column. Since a cluster may be configured to emit values for one or more of $AS_i$, $MS_i$, and $dS_j$ periodically at various intervals, each time such data is emitted new equations (i.e. equations with new known values) can be constructed based on equation 1 and/or equation 2. Once the cluster has emitted data enough times to construct the necessary number of equations for each column, the unknown VM Type Exchange Probabilities can be solved for. As will be discussed in more detail below, these values can be used to generate estimated remaining capacities (ERCs) for the cluster during blind periods, e.g. periods in which the system is not actively monitoring ARCs for the cluster.

In some implementations, the system may be configured to solve for the VM Type Exchange Probabilities based on triangular number sequencing to generate a greater number of usable time intervals than instances of cluster emitted data. The number of usable triangular intervals per p cluster data emission periods can be found based on the equation:

$$\frac{p(p+1)}{2} \quad \text{(Eq. 3)}$$

such that to solve a [n, n] matrix the number of cluster data emission periods needed to be observed is:

$$\left\lceil \sqrt{2(n-1) + \frac{1}{4}} - \frac{1}{2} \right\rceil \quad \text{(Eq. 4)}$$

It can be appreciated that the $p^{th}$ triangular number is given by equation 3, so to solve a [n, n] matrix we need to observe the number of periods yielded by equation 4. To further illustrate this point, equation 4 can be graphically represented by Chart 1 that is shown in FIG. 7.

Turning now to FIG. 2, a pictorial flow diagram shows an illustrative process 200 of generating estimated remaining capacities (ERCs) to determine whether to fulfill requests to commission VMs into a computing cluster. The process 200 is described with reference to illustrations accompanying blocks 201 through 209 and/or with further reference to FIGS. 1A-1C. Similar to other processes described herein, the process 200 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement described functionality. The order in which operations are described is not intended to be construed as a limitation, and any number of the described blocks can be combined in any order and/or in parallel to implement the process. Other processes described throughout this disclosure, in addition to process 200, shall be interpreted accordingly.

At block 201, a system may determine physical resource characteristics associated with the computing cluster 102. In some embodiments, the physical resource characteristics may include a physical resource amount that corresponds to at least one type of physical computing resource that is discretely installed within individual computing devices 104. Exemplary physical computing resources include, but are not limited to, central processing units (CPUs), CPU cores, amounts of random-access memory (RAM), and/or amounts of non-volatile data storage space. For example, determining physical resource characteristics of the computing cluster 102 may include determining an aggregate number of CPU cores installed within the computing cluster 102 and/or a specific number of CPU cores installed within individual computing devices 104 of the computing cluster 102. With particular reference to FIGS. 1A-1C, determining physical resource characteristics of the computing cluster 102 may include determining that each of devices 104(A)-104(N) includes 20 discreetly installed physical resource units such as, for example, CPU cores.

In some embodiments, the physical resource characteristics may include a plurality of maximum capacities of the computing cluster 102 with respect to individual ones of a plurality of VM types that are supported by the computing cluster 102. For example, it may be determined that the computing cluster 102 is configured to deploy four discreet VM types such as, for example, the first VM type 106(1) through the fourth VM type 106(4). Referring back now to FIG. 1A, since the first VM type 106(1) requires an allocation of eight PRUs and each of the four devices includes 20 discreetly installed PRUs, each device of the computing cluster is capable of simultaneously executing two instances of the first VM type 106(1). Therefore, the maximum capacity of the computing cluster 102 with respect to the first VM type 106(1) is eight. Stated plainly, the maximum capacity of a computing cluster with respect to any particular VM type is the maximum number of instances of that VM type that the computing cluster can simultaneously execute.

At block 203, the system may analyze an operational state of the computing cluster to determine a plurality of actual remaining capacities (ARCs) of the computing cluster with respect to the plurality of VM types supported by the computing cluster. For example, the cluster 102 may be configured to periodically emit data indicating a number of instances of each VM type currently being executed on each individual computing device of the computing cluster. In some embodiments, the system may determine an ARC corresponding to each VM type based on the number of instances of each VM type currently being executed on the individual computing devices within the cluster. For example, with particular reference to FIG. 1A, since at operational state A none of computing devices A, B, or C include eight or more unallocated PRUs and the last remaining computing device (i.e. computing device N 104(N)) includes only nine unallocated PRUs, it can be determined that the ARC of the cluster with respect to the first VM type 106(1) is one. It can be appreciated that the number of unallocated PRUs on each of the computing devices 104 can be determined once it is known how many of each type of VM is being executed on each device 104 and the number of PRUs that are discretely installed within each device 104.

At block 205, the system may monitor a physical resource allocation flux of the computing cluster 102. Since the number of PRUs allocated to each VM by type is known, monitoring the physical resource allocation flux may include simply determining a net increase of instances of each VM type being executed on the computing cluster since the previously analyzed state, e.g. the state analyzed at block 203. In some embodiments, monitoring the physical resource allocation flux includes monitoring a flux in the number of PRUs of the cluster that are allocated to the individual VM types. However, in some embodiments, the system may not be privy to information indicating a number of each VM type that is currently being executed on each computing device 104 within the cluster 102. Stated alternatively, the monitoring of the physical resource allocation flux may occur during a blind period that follows each analyzed operational state at which the ARCs are determined and during which the system may monitor instances of the VM types entering the cluster (e.g. being commissioned) and exiting the cluster (e.g. being decommissioned).

At block 207, the system may receive from a client a VM commission request indicating a request to commission at least one instance of a VM of a particular type into the computing cluster. Since some amount of time has passed since the ARCs were determined at block 203, the system may lack sufficient information to determine whether the cluster has sufficient capacity to accept the VM commission request. Accordingly, in order to determine whether to fulfill the VM commission request received at block 207, the system may rely on estimated remaining capacities (ERCs) of the computing cluster.

At block 209, the system may generate ERCs of the computing cluster with respect to the individual VM types. In some embodiments, the system to generate the ERCs by calculating the change in capacity of the computing cluster with respect to each VM type based on the physical resource allocation flux monitored at block 205. These changes in capacity can be calculated based equation 1 and/or equation 2 in a slightly modified form. In particular, changes in the cluster's capacity with respect to the individual VM types may be calculated based on the following function:

$$CS_i = \sum_{j=1}^{m} E[S_j, S_i]P[S_j, S_i]dS_j \qquad \text{(Eq. 5)}$$

where $CS_i$ is the estimated change in the cluster's capacity with respect to VM Type $S_i$, and where $dS_j$ corresponds to the physical resource allocation flux measured at block 205, and further where $P[S_j, S_i]$ corresponds to the VM type exchange probabilities solved for using equations 1 and/or equation 2 according to the techniques described above. In some embodiments, the system may substitute a predetermined value for any VM type exchange probabilities that has yet to be solved for, e.g. due to a lack of sufficient cluster data emission intervals. In some embodiments, the system may be configured to conservatively substitute unknown VM type exchange probabilities for P=1. In some embodiments, the system is configured to generate an ERC with respect to VM Type $S_i$ by calculating the $CS_i$ based on the physical resource allocation flux measured since state A of block 203 and then adding the result to the ARC of the VM Type $S_i$ determined for state A.

In various embodiments, the VM commission request may be a reservation request to reserve an allocation of PRUs to commission one or more VM instances into the computing cluster over some future time interval, e.g. starting in one day and lasting for one year. In determining whether to accept a reservation request, the system may determine a number of OnDemand VMs of each type that has been commissioned or decommissioned since one or more previous ARCs were updated. This data may be represented in the form of an On-Demand Delta table that, for each VM type, indicates the net number of that VM type that has been commissioned or decommissioned. This so called "On-Demand Delta table" can be used to generate ERCs according to the techniques described herein.

In some embodiments, the system may be configured to accept or deny the reservation request based on an AddVM function that models adding a single VM's capacity back to a cluster and a DeleteVM function that models deleting a single VM's capacity from to a cluster. Upon receiving the reservation request, the system may use the AddVM function and/or the DeleteVM function to model adding and/or subtracting each VM instance listed in the On-Demand Delta table from the cluster or, if there are multiple clusters in the virtualization system, to individual clusters thereof. For example, in a scenario where a virtualization system includes a plurality of clusters, the system may find a cluster for each VM Type in the On-Demand Delta table where SubstractVM or AddVM as outlined below returns a true value. The system may further be configured to determine each requested VM instance of the reservation request by type and then, for each instance, identify at least one cluster from the virtualization system (e.g. virtualization system architecture 400 as described below) which returns a true value for the SubtractVM function. In the event that no cluster can be identified that satisfies this condition, the reservation request may be denied.

An exemplary SubtractVm function to subtract a single VM from a cluster may be coded as follows:

```
bool SubtractVm(vmType)
{
    if (!clusterSupportedVmTypes.Contains(vmType))
    {
        return false;
    }
    remainingCapacity = remainingClusterCapacity;    // Deep copy
    foreach(exchangedVmType in clusterSupportedVmTypes)
    {
        exchangeProbability =
VmTypeExchangeProbability[vmType, exchangedVmType];
        if (Random(0, 1) > exchangeProbability) // Random returns fraction [0,1].
        {
            // The VM fit in a "fragmentation hole" and did not affect
        the remaining capacity of the exchanged VM type.
            //
            continue;
        }
        // Note that the VM type exchanges one to one with itself.
```

```
        // Thus reducing capacity for it is also accounted for here.
        exchangeRate = VmTypeExchangeRate[vmType, exchangedVmType];
        remainingCapacity[exchangedVmType] -= exchangeRate;
        if (remainingCapacity[exchangedVmType] < 1)
        {
            return false;
        }
    }
    remainingClusterCapacity = remainingCapacity;
    return true;
}
```

An exemplary AddVm function to add a single VM into a cluster may be coded as follows:

```
bool AddVm(vmType)
{
    if (!clusterSupportedVmTypes.Contains(vmType))
    {
        return false;
    }
    remainingCapacity = remainingClusterCapacity;  // Deep copy
    foreach(exchangedVmType in clusterSupportedVmTypes)
    {
        exchangeProbability =
VmTypeExchangeProbability[vmType, exchangedVmType];
        if (Random(0, 1) > exchangeProbability) // Random returns fraction [0,1].
        {
            // The VM was in a "fragmentation hole" and did not
        affect the remaining capacity of the exchanged VM type.
            //
            continue;
        }
        exchangeRate = VmTypeExchangeRate[vmType, exchangedVmType];
        remainingCapacity[exchangedVmType] += exchangeRate;
        if (remainingCapacity[exchangedVmType] > MaxClusteCapacity[exchangedVmType])
        {
            return false;
        }
    }
    remainingClusterCapacity = remainingCapacity;
    return true;
}
```

In some embodiments, the system may be configured to determine whether to fulfill the VM commission request based on a combination of outstanding reservation data and on-demand VM usage data. The on-demand VM usage data may indicate a number of on-demand VMs currently deployed on a particular computing cluster and/or a particular region of computing clusters. The outstanding reservation data may indicate a number of outstanding reservations for a particular computing cluster and/or a particular region of computing clusters. In particular, the system may be configured to consider a number of VM instances by each type that have been reserved against the computing cluster and/or particular region but which have not yet been redeemed. The system may be configured to then subtract capacity from the cluster and/or region that corresponds to the outstanding reservations based on the SubtractVM function described above. Once the subtract VM function has been deployed against the cluster and/or region for the outstanding reservations, then the ERCs for the cluster and/or region will account for the outstanding reservations. The system may then use these ERCs to determine whether to fulfill the VM Commission request at block 209.

Turning now to FIG. 3, a flow diagram shows an illustrative process 300 of generating ERCs by incrementally adjusting ARCs up or down based on a physical resource allocation flux and VM type exchange probabilities. Process 300 also includes iteratively updating the VM type exchange probabilities based on actual remaining capacities (ARCs) observed at two or more operational states of a computing cluster.

As described above, at block 203, the system may analyze an operational state of the computing cluster to determine a first set of ARCs with respect to a plurality of VM types supported by the computing cluster. For example, the cluster 102 may be configured to periodically emit data indicating how many instances of each VM type are currently being executed on each individual computing device of the computing cluster.

At block 301, the system may monitor a physical resource allocation out-flux associated with the individual VM types 106. Monitoring the out-flux at block 301 may include monitoring a virtualization system and/or individual clusters thereof to identify decommissioning events associated with individual VMs by type. For example, with particular reference to FIGS. 1A and 1B, the system may monitor the cluster 102 between times t=1 and t=N and may determine when VM 5 is decommissioned from the computing cluster 102. The system may further determine that VM 5 was an instance of the first VM type 106(1). Continuing with this example, the system may further determine when each of VM 2, VM 6, VM 8, and VM 15 are decommissioned from the computing cluster and that each of these instances corresponds to the third VM type 106(3). However, in various implementations, the system may be unable to discern from which computing device of the computing cluster each decommissioned VM instance was operating on. Stated alternatively, based on the monitoring the out-flux between times t=1 and t=N, the system may know that a single instance of the first VM type 106(1) and that for instances of the third VM type 106(3) were decommissioned but may not know how those instances were previously arranged within the computing cluster 102.

At block 303, the system may increment one or more of the ARCs determined at block 203 based on the VM type exchange probabilities in response to the out-flux associated with each VM type determined at block 301. In some embodiments, incrementing the ARCs at block 303 may include estimating whether an out-flux event associated with decommissioning a particular VM instance had an effect on the remaining capacity of a virtualization system and/or an individual computing cluster with respect to each supported VM type. For example, upon determining that VM 5 has been decommissioned, the system may identify VM type exchange probabilities for the first VM type 106(1) with respect to all VM types supported by the virtualization system. With particular reference to table 5 discussed above, it can be appreciated that because the first VM type 106(1) requires the largest allocation of PRUs of the supported VM types that P=1 with respect to all supported VM types.

In some embodiments, the system may increment the ARCs based upon equation 5 as outlined above. For example, the right side of equation 5 can be filled in based on the known VM type exchange rates and the estimated and/or previously solved for VM type exchange probabilities corresponding to the first VM type as well as the observation that only a single instance of the first VM type has been decommissioned between times t=1 and t=N. Accordingly, filling equation 5 and to determine the effect that decommissioning VM 5 had on the virtualization system's capacity with respect to the second VM type results in the following:

$$CS_2 = E[S_1, S_2]P[S_1, S_2]dS_j \xrightarrow{yields} 2 = 2 \times 1 \times 1 \qquad \text{(Eq. 6)}$$

where $CS_2$ is the estimated change in the cluster's capacity with respect to the second VM type, and where $dS_1$ corresponds to the number of instances of the first VM type that were decommissioned in the relevant time-period. Accordingly, the system may generate an ERC of the virtualization system and/or individual cluster by incrementing the ARC of the virtualization system with respect to the second VM type determined at block 203 of by two based on the result of equation 5.

In some embodiments, the system may increment the ARCs based upon a comparison of the VM type exchange probabilities, associated with decommissioned VM instances, to a randomly generated number between a predetermined range. For example, in implementations were the VM type exchange probabilities are bound by a lower probability of zero that indicates a 0% likelihood and an upper probability of one indicating a 100% likelihood, the system may generate a random number between zero and one and compare the randomly generated number to VM type exchange probabilities associated with decommissioned VM instances. If the randomly generated number is larger than a corresponding VM type exchange probability corresponding to a decommissioned VM instance and a particular VM type, the system may assume that the virtualization system's capacity with respect to the particular VM type was unaffected. This can be repeated for each decommissioned VM instance.

Continuing with the previous example, the system may generate a new random number based on the decommissioning of each of VM 2, VM 6, VM 8, and VM 15. For illustrative purposes, consider a scenario where P[$VM_3$, $VM_1$] has been solved for using techniques described above and determined to be 0.528. Further suppose that random numbers generated for each of these decommissioned VM instances are as: Random[0, 1]$_{VM\ 2}$=0.568; Random[0, 1]$_{VM\ 6}$=0.456; Random[0, 1]$_{VM\ 8}$=0.254; and Random[0, 1]$_{VM\ 15}$=0.951. Based on the foregoing hypothetical scenario, the system may assume that the decommissioning of VM 8 and VM 6 did affect the virtualization system's capacity with respect to the first VM type 106(1) but that the decommissioning of VM 2 and VM 15 had no such effect. Accordingly, the system would increment the virtualization system's ERC with respect to the first VM type 106(1) up by one upon the decommissioning of VM 8 and VM 6, but would refrain from incrementing the ERC upon the decommissioning of VM 2 and VM 15.

At block 305, the system may monitor a physical resource allocation in-flux associated with the individual VM types 106. Monitoring the in-flux at block 301 may include monitoring the virtualization system and/or individual clusters thereof to identify commissioning events associated with individual VMs by type. For example, with particular reference to FIGS. 1A and 1B, the system may monitor the cluster 102 between times t=1 and t=N and may determine when VM 18 is commissioned into the computing cluster 102 and that it is an instance of the fourth VM type 106(4). In practical terms, the operation at block 305 is the reverse of the operation at block 301.

At block 307, the system may decrement one or more of the ARCs determined at block 203 based on the VM type exchange probabilities in response to the in-flux associated with each VM type determined at block 305. In some embodiments, decrementing the ARCs at block 307 may include estimating whether an in-flux event associated with commissioning a particular VM instance had an effect on the remaining capacity of the virtualization system and/or computing cluster with respect to each VM type supported by that virtualization system into a computing cluster. In practical terms, the operation at block 307 is the reverse of the operation at block 303.

At block 309, the system may analyze another operational state of the computing cluster, that is subsequent to the operational state analyzed at block 203, to determine a second plurality of ARCs with respect to the plurality of VM types supported by the computing cluster.

At block 311, the system may update the VM type exchange probabilities based on a comparison of the ARCs determined at block 203 to the ARCs determined at block 309. For example, the system may generate new "known" values for use in equation 1 and/or equation 2 based on the newly available intervals as illustrated with respect to the equation 3 and equation 5. Then, based on these new known values the system may resolve for the VM type exchange probabilities using techniques disclosed above.

Once the VM type exchange probabilities have been updated at block 311, the process 300 may loop back to block 301. Furthermore, the incrementing operation performed at block 303 and/or decrementing operation performed at block 307 may be performed against the new ARCs determined at block 309. In this way, the iterative process 300 may self-calibrate itself each time the process loops through operation 309 to determine new ARCs.

FIG. 4 is an illustrative virtualization system architecture 400 that includes multiple data centers 402 distributed across multiple geographical regions 404 with each data center including one or more clusters 102 of computing devices 104 that have finite amounts of PRUs installed therein. As illustrated, in some implementations a virtualization system may include one or more data centers 402 within each geographical region 404 wherein the multiple data centers are each configured to communicate via a network 406.

As illustrated, the individual computing devices 104 included within the multiple clusters 102 may include one or more types of discreetly installed physical resources 408. For example, the individual computing devices 104 include a plurality of discreetly installed CPU cores 410. In some embodiments, multiple individual CPU cores may be included within individually installed CPUs. For example, an individual device 104 may include ten discreetly installed four core CPUs such that the total amount of discreetly installed CPU cores is equal to 40. The discreetly installed physical resources 408 may also include one or more memory units 412. In various implementations, memory units 412 may be partitioned such that multiple VM instances may be allocated PRUs from individual memory units 412. For example, memory unit 412(A) may be a discreetly installed 100 Gibibyte RAM unit that is allocated to the VM instances in one Gibibyte chunks. Stated alternatively, a single inseparable physical unit of memory may comprise multiple separately assignable PRUs. As further illustrated, the individual computing devices 104 included within the multiple clusters 102 may also include one or more network interfaces 414 to enable communication via the network 406.

In various implementations, the techniques described herein may be deployed at the cluster level to determine exchange data 416 corresponding to individual clusters 102. For example, in analyzing the virtualization system architecture 400 the techniques described herein may be used to determine characteristics associated with each individual cluster 102 such as, for example, the various VM types supported by each individual cluster 102 as well as a maximum capacity of each individual cluster 102 with respect to each of the various supported VM types. The characteristics associated with each individual cluster may also include an amount of discreetly installed physical resource units of one or more types. For example, the characteristics may include an amount of discreetly installed CPU cores as well as an amount of discreetly installed available RAM.

In some embodiments, the VM types may be defined in terms of multiple different types of physical resources. For example, each individual VM type may be defined in terms of both a number of CPU cores as well as an amount of memory. Accordingly, the maximum capacity of each individual clutch cluster individual cluster 102 with respect to each of the various supported VM types may be determined based on which one of multiple different types of physical resources become a constraint to deploy additional instances. For example, one virtual machine type may be designed for computationally intensive applications and therefore may be assigned a relatively large number of CPU cores as compared to memory and may cause the computing cluster 102 to become CPU constrained while still having ample memory left. Conversely another virtual machine type may be designed for memory intensive applications such that the cluster becomes memory constrained and has numerous CPU cores left idle.

It can be appreciated that the techniques described herein to solve for the VM type exchange probabilities may be equally applicable to VM types defined in terms of multiple different types of physical resources. To illustrate this point, consider that the first through fourth VM types (i.e. 106(1)-106(4)) are further defined in terms of an amount of used memory and that the maximum capacity of a particular computing cluster with respect to the first VM type 106(1) is constrained based on the particular computing cluster CPU core amount but that that computing clusters's maximum capacity with respect to the fourth VM type 106(4) is constrained based on the particular computing cluster's memory amount. Consider that the techniques described herein to solve for the VM type exchange probabilities require only knowledge of VMs fluxing into and out of the system, ARCs of the system at various states, and corresponding exchange rates between the VMs (which for VMs defined in terms of multiple different types of physical resources can be set to the most conservative exchange rate of the various physical resource types, e.g. if the exchange rate between two VM types is 4 in terms of memory and 3 in terms of CPUs, the more conservative rate of 4 may be selected). Based on these observations, it can be appreciated that the techniques disclosed herein to solve for the VM type exchange probabilities can be used regardless similarly deployed regardless of how many types of physical resources each VM type is defined in terms of.

Turning now to FIG. 5, a flow diagram is shown of an illustrative process 500 for analyzing subsequent operational states of multiple computing clusters to determine ARCs corresponding to individual ones of the multiple clusters and, ultimately, to generate associated VM type exchange probabilities. The process 500 is described with reference to FIG. 4.

At block 501, the system may analyze one or more first operational states that correspond to individual ones of multiple clusters to determine at least one group of first ARCs for each individual cluster. For example, with reference to the virtualization system architecture 400, an initial state may be analyzed with respect to each of cluster A 102(A) through cluster F 102(F). Based on the initial operational states analyzed with respect to the individual cluster's 102, the system may determine first ARCs corresponding to each of the individual clusters 102.

At block 503, the system may monitor a physical resource allocation flux that follows the initial operational states corresponding to the individual cluster's 102. In various embodiments monitoring the physical resource allocation flux at block 503 may include monitoring physical resource allocation flux at the individual cluster level and/or monitoring physical resource allocation flux at the individual data center level.

At block 505, the system may analyze one or more second operational states that correspond to the individual clusters 102 to determine groups of second ARCs for each individual cluster. For example, with reference to the virtualization system architecture 400, a subsequent state that follows the initial state of block 501 may be analyzed with respect to each of cluster A 102(A) through cluster F 102(F). Based on the subsequent operational states analyzed with respect to the individual cluster's 102, the system may determine second ARCs corresponding to each of the individual clusters 102. With reference back to the equation 1, it can be appreciated that the difference between the second ARCs for a particular cluster in the first ARCs for that particular cluster corresponds to $AS_i$ values for that particular cluster with respect to the various VM types that the particular cluster supports.

At block 507, the system may generate VM type exchange probabilities according to techniques described herein. In some embodiments, the operation at block 507 may include generating unique sets of VM type exchange probabilities for the individual clusters 102 within the data centers 402 at block 509. For example, individual sets of the exchange data 416 may uniquely correspond to individual clusters 102, e.g. cluster A exchange data 416(A) may uniquely correspond to cluster A 102(A). In some embodiments, the operation of block 507 may include generating unique sets of VM type exchange probabilities for the individual data centers 402 within the geographical regions 404 at block 511. Accordingly, it can be appreciated that the techniques described herein may be deployed at the individual cluster level, the individual data center level, and/or even in some cases by geographical region.

FIG. 6 shows additional details of an example computer architecture 600 for a computer capable of performing functionality described herein. Thus, the computer architecture 600 illustrated in FIG. 6 illustrates an architecture for a server computer, or network of server computers, or any other types of computing devices suitable for implementing the functionality described herein. The computer architecture 600 may be utilized to execute any aspects of the software components presented herein.

The computer architecture 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 614, other data, and one or more application programs. The mass storage device 612 may further include one or more a flux monitoring service for monitoring physical resource allocation flux as described herein and an ERC generation service for generating ERCs as described herein.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes the claims, the phrase "computer storage medium," "computer-readable storage medium" and variations thereof, does not include waves, signals, and/or other transitory and/or intangible communication media, per se.

According to various configurations, the computer architecture 600 may operate in a networked environment using logical connections to remote computers through a network 650 and/or another network (not shown). The computer architecture 600 may connect to the network 650 through a network interface unit 620 connected to the bus 610. It should be appreciated that the network interface unit 620 also may be utilized to connect to other types of networks and remote computer systems. The computer architecture 600 also may include an input/output controller 622 for receiving and processing input from a number of other devices, including a keyboard, mouse, or electronic stylus (not shown in FIG. 6). Similarly, the input/output controller 622 may provide output to a display screen, a printer, or other type of output device (also not shown in FIG. 6). It should also be appreciated that via a connection to the network 650 through a network interface unit 620, the commuting architecture may enable communication with and/or between the computing clusters and/or data centers described herein.

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components and/or functionality presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

Example Clauses

The disclosure presented herein may be considered in view of the following clauses.

Example Clause A, a computer-implemented method, comprising: determining, for a computing cluster having a plurality of computing devices configured to deploy a plurality of virtual machine (VM) types, at least one physical resource amount corresponding to at least one physical resource type that is discretely installed within individual computing devices of the plurality of computing devices; determining, based on the at least one physical resource amount, a plurality of maximum capacities corresponding to the computing cluster, wherein individual maximum capacities of the plurality of maximum capacities correspond to individual VM types of the plurality of VM types; analyzing a first state of the computing cluster based on the plurality of maximum capacities that correspond to the individual VM types; monitoring, during a blind period that follows the first state and during which an arrangement of VM instances within the computing cluster is unknown, a physical resource allocation flux, of the computing cluster, that is associated with the individual VM types; receiving at least one request to commission at least one VM into the computing cluster; and generating, based on the physical resource allocation flux, a plurality of first estimated remaining capacities (ERCs) of the computing cluster to determine whether to fulfill the at least one request to commission the at least one VM into the computing cluster.

Example Clause B, the computer-implemented method of Example Clause A, wherein generating a particular first ERC that corresponds to a particular VM type is based on a plurality of VM type exchange probabilities that correspond to the particular VM type and individual ones of the plurality of VM types.

Example Clause C, the computer-implemented method of Example Clause A or Example Clause B, wherein the analyzing the first state includes analyzing the first state of the computing cluster to determine a plurality of first actual remaining capacities (ARCs), and wherein individual first ARCs of the plurality of first ARCs correspond to the individual VM types, and wherein the method further comprises: analyzing a second state of the computing cluster to determine a plurality of second ARCs of the computing cluster, wherein individual second ARCs of the plurality of second ARCs correspond to the individual VM types; and updating the plurality of VM type exchange probabilities based on a comparison of the plurality of second ARCs to the plurality of first ERCs.

Example Clause D, the computer-implemented method of Example Clause C, wherein the generating the plurality of ERCs comprises: incrementing the individual first ARCs based on a first group of VM type exchange probabilities that correspond to a first group of VMs that are decommissioned from the computing cluster subsequent to the first state; and decrementing the individual first ARCs based on a second group of the VM type exchange probabilities that correspond to a second group of VMs that are commissioned into the computing cluster subsequent to the first state.

Example Clause E the computer-implemented method of any one of Example Clauses A through D, wherein the monitoring the physical resource allocation flux comprises determining, for the individual VM types, a corresponding difference between: commissioned VMs that are commenced subsequent to the first state and decommissioned VMs that are terminated subsequent to the first state.

Example Clause F the computer-implemented method of any one of Example Clauses A through E, wherein individual first ERCs, of the plurality of first ERCs, indicate an ability of the cluster to utilize a remainder of the at least one physical resource amount to commission specific ones of the individual VM types.

Example Clause G the computer-implemented method of any one of Example Clauses A through F, wherein the at least one request to commission the at least one VM is a request to commission one or more on-demand VMs into the computing cluster, and wherein determining whether to fulfill the request to commission the one or more on-demand VMs is based on an on-demand VM usage level of the computing cluster and outstanding reservation data indicating accepted VM reservations.

Example Clause H the computer-implemented method of any one of Example Clauses A through G, further comprising monitoring, during the blind period, the plurality of maximum capacities to identify at least one of a capacitive increase or a capacitive decrease, wherein determining whether to fulfill the at least one request is further based on at least one of the capacitive increase or the capacitive decrease.

While Example Clauses A through H are described above with respect to a computer-implemented method, it is understood in the context of this document that the subject matter of Example Clauses A through H can also be implemented by a device, via a system, and/or via computer-readable storage media.

Example Clause I, a system, comprising: one or more processors; and a memory in communication with the processor, the memory having computer-readable instructions stored thereupon that, when executed by the processor, cause the one or more processors to: determine a plurality of physical resource amounts corresponding to a physical resource type that is discretely installed within individual computing devices of a plurality of computing clusters; analyze at least one first state of the plurality of computing clusters to determine a first plurality of actual remaining capacity (ARCs) corresponding to the plurality of computing clusters; monitor a physical resource allocation flux, of plurality of computing clusters, that follows the at least one first state; analyze at least one second state of the plurality of computing clusters to determine a second plurality of ARCs corresponding to the plurality of computing clusters; and generate VM type exchange probabilities for the plurality of computing clusters based on the physical resource allocation flux and at least one comparison of the first plurality of ARCs to the second plurality of ARCs.

Example Clause J, the system of Example Clause I, wherein the instructions cause the one or more processors to: analyze the at least one first state to determine a first ARC corresponding to a first computing cluster and a second ARC corresponding to a second computing cluster; and analyze the at least one second state to determine a third ARC corresponding to the first computing cluster and a fourth ARC corresponding to the second computing cluster, wherein the VM type exchange probabilities include: a first group of VM type exchange probabilities, corresponding to the first computing cluster, that are based on a comparison of the first ARC to the third ARC, and a second group of VM type exchange probabilities, corresponding to the second computing cluster, that are based on a comparison of the second ARC to the fourth ARC.

Example Clause K, the system of any of Example Clauses I though J, wherein the instructions cause the one or more processors to monitor a first physical resource allocation flux of the first computing cluster and a second physical resource allocation flux of the second computing cluster.

Example Clause L, the system of any of Example Clauses I though K, wherein individual VM type exchange probabilities of the VM type exchange probabilities correspond to at least one of a specific computing cluster, a specific data center that houses a subset of the plurality of computing clusters, or a specific geographic region that includes one or more data centers.

Example Clause M, the system of any of Example Clauses I though L, wherein individual ones of the plurality of physical resource amounts indicate at least one of an amount of processors that are discretely installed within the individual computing devices, or an amount of processor cores that are discretely installed within the individual computing devices.

Example Clause N, the system of any of Example Clauses I though M, wherein the instructions cause the one or more processors to generate, based at least in part on the VM type exchange probabilities and the physical resource allocation flux, at least one estimated remaining capacity (ERC) corresponding to the plurality of computing clusters.

Example Clause O, the system of any of Example Clauses I though N, wherein the instructions cause the one or more processors to: receive a request to commission at least one VM into the plurality of computing clusters; and determine whether to fulfill the request based on the at least one ERC and outstanding reservation data indicating an amount of the physical resource type that is reserved based on one or more other requests to commission VMs into the plurality of computing clusters.

While Example Clauses I through O are described above with respect to a system, it is understood in the context of this document that the subject matter of Example Clauses I through O can also be implemented by a device, via a computer-implemented method, and/or via computer-readable storage media.

Example Clause P, a computer-readable storage medium having computer-executable instructions stored thereupon which, when executed by one or more processors, cause the one or more processors to: determine, for individual virtual machine (VM) types of a plurality of VM types, a plurality of VM type exchange rates that indicates a ratio of physical resources used by the individual VM types with respect to other ones of the plurality of VM types; analyze sequential states of at least one computing cluster to periodically determine a plurality of actual remaining capacities (ARCs) corresponding to the individual VM types; generate, for the individual VM types with respect to the other ones of the plurality of VM types, VM type exchange probabilities that are based on two or more periodic sets of ARCs; and generate, based on at least the VM type exchange probabilities and a physical resource allocation flux, a plurality of estimated remaining capacities (ERCs) indicating an ability of the at least one computing cluster to deploy additional ones of the individual VM types.

Example Clause Q, the computer-readable storage medium of Example Clause P, wherein the at least one computing cluster comprises a plurality of computing clusters, and wherein the computer-executable instructions further cause the one or more processors to determine, for individual computing clusters of the plurality of computing clusters, corresponding physical resource allocation fluxes associated with the individual VM types being at least one of commissioned or decommissioned.

Example Clause R, the computer-readable storage medium of any one of Example Clause P through Q, wherein the physical resource allocation flux corresponds to changes to an allocated amount of at least one of processing resources or memory resources.

Example Clause S, the computer-readable storage medium of any one of Example Clauses P through R, wherein generating the plurality of ERCs is further based on a function of at least the plurality of VM type exchange rates, the VM exchange probabilities, and the physical resource allocation flux.

Example Clause T, the computer-readable storage medium of any one of Example Clauses P through S, wherein the computer-executable instructions further cause the one or more processors to: receive a request to commission one or more VMs into the at least one computing cluster; determine physical resource parameters associated with the one or more VMs; and generate a response to the request based on the plurality of ERCs and the physical resource parameters, the response indicating whether the request is accepted or declined.

While Example Clauses P and T are described above with respect to a system, it is understood in the context of this document that the subject matter of Example Clauses S and T can also be implemented by a device, via a computer-implemented method, and/or via computer-readable storage media.

Conclusion

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method, comprising:
   determining, for a computing cluster having a plurality of computing devices configured to deploy a plurality of virtual machine (VM) types, at least one physical resource amount corresponding to at least one physical resource type that is discretely installed within individual computing devices of the plurality of computing devices;
   determining, based on the at least one physical resource amount, a plurality of maximum capacities corresponding to the computing cluster, wherein individual maximum capacities of the plurality of maximum capacities correspond to individual VM types of the plurality of VM types;
   analyzing a first state of the computing cluster based on the plurality of maximum capacities that correspond to the individual VM types;
   monitoring, during a blind period that follows the first state and during which an arrangement of VM instances within the computing cluster is unknown, a physical resource allocation flux, of the computing cluster, that is associated with the individual VM types;
   receiving at least one request to commission at least one VM into the computing cluster; and
   generating, based on the physical resource allocation flux, a plurality of first estimated remaining capacities (ERCs) of the computing cluster to determine whether to fulfill the at least one request to commission the at least one VM into the computing cluster.

2. The computer-implemented method of claim 1, wherein generating a particular first ERC that corresponds to a particular VM type is based on a plurality of VM type exchange probabilities that correspond to the particular VM type and individual ones of the plurality of VM types.

3. The computer-implemented method of claim 2, wherein the analyzing the first state includes analyzing the first state of the computing cluster to determine a plurality of first actual remaining capacities (ARCs), and wherein individual first ARCs of the plurality of first ARCs correspond to the individual VM types, and wherein the method further comprises:
   analyzing a second state of the computing cluster to determine a plurality of second ARCs of the computing cluster, wherein individual second ARCs of the plurality of second ARCs correspond to the individual VM types; and
   updating the plurality of VM type exchange probabilities based on a comparison of the plurality of second ARCs to the plurality of first ERCs.

4. The computer-implemented method of claim 3, wherein the generating the plurality of ERCs comprises:
   incrementing the individual first ARCs based on a first group of VM type exchange probabilities that correspond to a first group of VMs that are decommissioned from the computing cluster subsequent to the first state; and
   decrementing the individual first ARCs based on a second group of the VM type exchange probabilities that correspond to a second group of VMs that are commissioned into the computing cluster subsequent to the first state.

5. The computer-implemented method of claim 1, wherein the monitoring the physical resource allocation flux comprises determining, for the individual VM types, a corresponding difference between: commissioned VMs that are commenced subsequent to the first state and decommissioned VMs that are terminated subsequent to the first state.

6. The computer-implemented method of claim 1, wherein individual first ERCs, of the plurality of first ERCs, indicate an ability of the cluster to utilize a remainder of the at least one physical resource amount to commission specific ones of the individual VM types.

7. The computer-implemented method of claim 1, wherein the at least one request to commission the at least one VM is a request to commission one or more on-demand VMs into the computing cluster, and wherein determining whether to fulfill the request to commission the one or more on-demand VMs is based on an on-demand VM usage level of the computing cluster and outstanding reservation data indicating accepted VM reservations.

8. The computer-implemented method of claim 1, further comprising monitoring, during the blind period, the plurality of maximum capacities to identify at least one of a capacitive increase or a capacitive decrease, wherein determining whether to fulfill the at least one request is further based on at least one of the capacitive increase or the capacitive decrease.

9. A system, comprising:
   one or more processors; and
   a memory in communication with the processor, the memory having computer-readable instructions stored thereupon that, when executed by the processor, cause the one or more processors to:
      determine a plurality of physical resource amounts for a computing cluster that includes a plurality of computing devices that are configured to deploy a plurality of virtual machine types;
      determine, based on the plurality of physical resource amounts, a plurality of maximum capacities of the computing cluster with respect to the plurality of virtual machine types;

analyze an operational state of the computing cluster to determine at least one actual remaining capacity of the computing cluster; and subsequent to determining the at least one actual remaining capacity:
- receive a request to commission an instance of a particular virtual machine type into the computing cluster;
- determine at least one estimated remaining capacity of the computing cluster based on the at least one actual remaining capacity and a physical resource allocation flux that occurs a blind period that follows the operational; and
- determine whether to fulfill the request based on the at least one estimated remaining capacity.

10. The system of claim 9, wherein the plurality of physical resource amounts for the computing cluster correspond to a plurality of physical resource types that are discretely installed within individual computing devices of the plurality of computing devices.

11. The system of claim 9, wherein individual maximum capacities of the plurality of maximum capacities correspond to individual virtual machine types of the plurality of virtual machine types.

12. The system of claim 9, wherein determining particular estimated remaining capacities that individually correspond to particular virtual machine types is based on virtual machine type exchange probabilities that correspond to particular virtual machine types.

13. The system of claim 9, wherein the instructions cause the one or more processors to monitor the physical resource allocation flux by determining, for individual virtual machine types, a corresponding difference between: commissioned virtual machines that are commenced subsequent to the operational state and decommissioned virtual machines that are terminated subsequent to the operational state.

14. The system of claim 9, wherein the at least one estimated remaining capacity includes a plurality of individual estimated remaining capacities that each indicate an ability of the computing cluster to utilize the plurality of physical resource amounts to commission specific virtual machine types.

15. The system of claim 9, wherein the request to commission the instance of the particular virtual machine type into the computing cluster is a request to commission an on-demand instance of the particular virtual machine type into the computing cluster.

16. The system of claim 15, wherein determining whether to fulfill the request to commission the on-demand instance of the particular virtual machine type into the computing cluster is based on an on-demand virtual machine usage level of the computing cluster and outstanding reservation data indicating accepted virtual machine reservations.

17. A computer-readable storage medium having computer-executable instructions stored thereupon which, when executed by one or more processors, cause the one or more processors to:
- determine a physical resource amount for a computing cluster that is configured to deploy a plurality of virtual machine types;
- determine, based on the physical resource amount, a plurality of maximum capacities of the computing cluster with respect to the plurality of virtual machine types;
- analyze an operational state of the computing cluster to determine a plurality of actual remaining capacities of the computing cluster;
- monitor a physical resource allocation flux of the computing cluster;
- determine a plurality of estimated remaining capacities of the computing cluster based on the plurality of actual remaining capacities and the physical resource allocation flux;
- receive a request to commission an on-demand instance of a particular virtual machine type into the computing cluster;
- determine whether to fulfill the request based on the at least one estimated remaining capacity.

18. The computer-readable storage medium of claim 17, wherein monitoring the physical resource allocation flux comprises determining a difference between commissioned virtual machines and decommissioned virtual machines.

19. The computer-readable storage medium of claim 17, wherein the plurality of estimated remaining capacities are further determined based on virtual machine type exchange probabilities that correspond to particular virtual machine types.

20. The computer-readable storage medium of claim 19, wherein the computer-executable instructions further cause the one or more processors to update the virtual machine type exchange probabilities that correspond to the particular virtual machine types based on a comparison of the plurality of estimated remaining capacities to another plurality of actual remaining capacities of the computing cluster that are determined by analyzing another operational state of the computing cluster.

* * * * *